US012676162B2

(12) United States Patent
Luis Valero et al.

(10) Patent No.: US 12,676,162 B2
(45) Date of Patent: Jul. 7, 2026

(54) APPARATUS AND METHOD FOR MULTICHANNEL INTERFERENCE CANCELLATION

(71) Applicant: Fraunhofer-Gesellschaft zur Förderung der angewandten Forschung e.V., Munich (DE)

(72) Inventors: Maria Luis Valero, Nuremberg (DE); Emanuel Habets, Spardorf (DE); Paolo Annibale, Erlangen (DE); Anthony Lombard, Erlangen (DE); Moritz Wild, Nuremberg (DE); Marcel Rutha, Ingolstadt (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/658,512

(22) Filed: Oct. 21, 2019

(65) Prior Publication Data

US 2020/0051581 A1 Feb. 13, 2020

Related U.S. Application Data

(63) Continuation of application No. PCT/EP2018/060006, filed on Apr. 19, 2018.

(30) Foreign Application Priority Data

Apr. 20, 2017 (EP) .................................... 17167304
Oct. 13, 2017 (EP) .................................... 17196416

(51) Int. Cl.
*H04R 3/02* (2006.01)
*G10L 21/0208* (2013.01)
(Continued)

(52) U.S. Cl.
CPC ............ *G10L 21/0232* (2013.01); *H04R 3/02* (2013.01); *H04S 3/008* (2013.01);
(Continued)

(58) Field of Classification Search
CPC ....... G10L 21/02–0388; G10L 21/0232; G10L 2021/02082; G10L 2021/02166;
(Continued)

(56) References Cited

U.S. PATENT DOCUMENTS 5,828,756 A * 10/1998 Benesty ................ H04M 9/082 381/66
7,062,038 B1 6/2006 Sandeep et al.
(Continued)

FOREIGN PATENT DOCUMENTS

EP 2574082 A1 9/2011
EP 2890154 A1 * 7/2015 ........... H04R 25/453
(Continued)

OTHER PUBLICATIONS

Meng Guo et al., Analysis of Acoustic Feedback/Echo Cancellation in Multiple-Microphone and Single-Loudspeaker Systems Using a Power Transfer Function Method, IEEE Transactions on Signal Processing, vol. 59, No. 12, Dec. 2011.
(Continued)

*Primary Examiner* — Leshui Zhang
(74) *Attorney, Agent, or Firm* — NKL LAW; Jae Youn Kim

(57) ABSTRACT

An apparatus for multichannel interference cancellation in a received audio signal including two or more received audio channels to obtain a modified audio signal including two or more modified audio channels is provided. The apparatus includes a first filter unit being configured to generate a first estimation of a first interference signal depending on a reference signal. Moreover, the apparatus includes a first
(Continued)

interference canceller being configured to generate a first modified audio channel of the two or more modified audio channels from a first received audio channel of the two or more received audio channels depending on the first estimation of the first interference signal. Furthermore, the apparatus includes a second filter unit being configured to generate a second estimation of a second interference signal depending on the first estimation of the first interference signal.

15 Claims, 12 Drawing Sheets

(51) Int. Cl.
*G10L 21/0232* (2013.01)
*H04S 3/00* (2006.01)
*G10L 21/0216* (2013.01)
*H04M 9/08* (2006.01)
*H04R 3/00* (2006.01)

(52) U.S. Cl.
CPC ............... *G10L 2021/02082* (2013.01); *G10L 2021/02166* (2013.01); *H04R 3/005* (2013.01); *H04S 2400/01* (2013.01)

(58) Field of Classification Search
CPC . G10K 11/178–17885; G10K 2210/30; G10K 2210/3012–30232; G10K 2210/3025; G10K 2210/3026; G10K 2210/3028; G10K 2210/30281; G10K 2210/3035; G10K 2210/30351; G10K 2210/505; G10K 2210/506; H04R 27/00; H04R 2227/005; H04R 3/02; H04R 3/005; H04S 2400/01; H04S 3/02
USPC ......... 381/17, 18, 19, 20, 21, 300, 301, 302, 381/303, 307, 119, 66, 27, 71.1–71.6, 381/71.9, 71.11, 71.12, 26, 318, 86, 92, 381/94.1, 93, 95, 9, 6, 122, 123; 379/406.01–406.16; 455/569.1, 570; 704/19.014, 21.002, 21.004, 21.007; 700/94
See application file for complete search history.

(56) References Cited

U.S. PATENT DOCUMENTS 9,325,855 B2 * 4/2016 Liu .......................... H04B 3/20
9,997,151 B1 * 6/2018 Ayrapetian .......... G10L 21/0208
2013/0301840 A1 11/2013 Yemdji et al.
2014/0016794 A1 * 1/2014 Lu .......................... H04R 3/002 381/66
2014/0334620 A1 11/2014 Yemdji et al.
2015/0189450 A1 7/2015 Van Der Werf
2016/0275961 A1 9/2016 Yu et al.

FOREIGN PATENT DOCUMENTS

JP 2015-019185 A 1/2015
JP 2015-136105 A 7/2015
WO 97/23068 A2 6/1997
WO 2000/041330 A1 7/2000

OTHER PUBLICATIONS

E. Hansler and G. Schmidt “Acoustic Echo and Noise Control: A practical Approach” Chapter 9, 2004, New Jersey, USA: Wiley.
S. Haykin “Adaptive Filter Theory”, 4th ed. Prentice-Hall, 2001, New Jersey, USA.
W. Kellermann, “Strategies for combining acoustic echo cancellation and adaptive beamforming microphone arrays”, in Proc. IEEE ICASSP, Apr. 1997, pp. 219-222, Munich, Germany.
O. Shalvi et al, “System identification using nonstationary signals”, IEEE Trans. Signal Process, Aug. 1996, vol. 44, No. 8, pp. 2055-2063.
S. Gannot et al. “Signal enhancement using beamforming and nonstationarity with applications to speech,” IEEE Trans. Signal Process., Aug. 2001, vol. 49, No. 8, pp. 1614-1626.
I. Cohen, “Relative transfer function identification using speech signals,” IIEEE Trans. Speech Audio Process, Sep. 2004, vol. 12, No. 5, pp. 451-459.
R. Talmon et al, “Relative transfer function identification using convolutive transfer function approximation,” IIEEE Trans. Audio, Speech, Lang. Process, May 2009, vol. 17, No. 4, pp. 546-555.
G. Reuven et al, “Joint noise reduction and acoustic echo cancellation using the transfer-function generalized sidelobe canceller,” Speech Communication, Aug. 2007, vol. 49, No. 7-8, pp. 623-635.
R. Talmon et al. “Convolutive transfer function generalized sidelobe canceler,” IEEE Transactions on Audio, Speech, and Language Processing, Sep. 2009, vol. 17, No. 7, pp. 1420-1434.
T. Dvorkind et al., “Speaker localization in a reverberant environment,” in Proc. the 22nd convention of Electrical and Electronics Engineers in Israel (IEEEI), Dec. 2002, pp. 7-7, Tel-Aviv, Israel.
T. Dvorkind et al., “Time difference of arrival estimation of speech source in a noisy and reverberant environment,” Signal Processing, Jan. 2005, vol. 85, No. 1, pp. 177-204.
X. Li et al., “Estimation of the direct-path relative transfer function for supervised sound-source localization,” IEEE Trans. Audio, Speech, Lang. Process., Nov. 2016, vol. 4, No. 11, pp. 2171-2186.
C. Yemdji et al, “Dual channel echo postfiltering for hands-free mobile terminals,” in Proc. IWAENC, Sep. 2012, pp. 1-4, Aachen, Germany.
W. Kellermann, “Joint design of acoustic echo cancellation and adaptive beamforming for microphone arrays,” in Proc. Intl. Workshop Acoust. Echo Noise Control (IWAENC), 1997, pp. 81-84, London, UK.
W. Herbordt et al., “GSAEC—acoustic echo cancellation embedded into the generalized sidelobe canceller,” in Proc. European Signal Processing Conf. (EUSIPCO), vol. 3, Sep. 2000, pp. 1843-1846, Tampere, Finland.
W. Herbordt et al., “Joint optimization of LCMV beamforming and acoustic echo cancellation,” in Proc. European Signal Processing Conf. (EUSIPCO), Sep. 2004, pp. 2003-2006, Vienna, Austria.
K.-D. Kammeyer et al., “New aspects of combining echo cancellers with beamformers,” in Proc. IEEE ICASSP, Mar. 2005, vol. 3, pp. 137-140, Philadelphia, USA.
Y. Avargel et al., “Adaptive system identification in the short-time fourier transform domain using cross-multiplicative transfer function approximation,” IEEE Trans. Audio, Speech, Lang. Process., Jan. 2008 vol. 16, No. 1, pp. 162-173.
Y. Avargel et al., “System identification in the short-time Fourier transform domain with crossband filtering,” IEEE Trans. Audio, Speech, Lang. Process., May 2007, vol. 15, No. 4, pp. 1305-1319.
Y. Avargel et al. “On multiplicative transfer function approximation in the short-time fourier transform domain,” IEEE Signal Process. Lett., May 2007, vol. 14, No. 5, pp. 337-340.
I. Cohen, “Speech enhancement using a noncausal a priori SNR estimator,” IEEE Signal Process. Lett., Sep. 2004, vol. 11, No. 9, pp. 725-728.
J. B. Allen et al., “Image method for efficiently simulating small-room acoustics,” J. Acoust. Soc. Am., Apr. 1979, vol. 65, No. 4, pp. 943-950.
P. C. W. Sommen, “Partitioned frequency-domain adaptive filters,” in Proc. Asilomar Conf. on Signals, Systems and Computers, 1989, pp. 677-681.
J. J. Shynk, “Frequency-domain and multirate adaptive filtering,” IEEE Signal Process. Mag., Jan. 1992, vol. 9, No. 1. pp. 14-37.
M. Dentino et al., “Adaptive filtering in the frequency domain,” Proc. of the IEEE, vol. 66, No. 12, pp. 1658-1659, Dec. 1978.

(56) References Cited

OTHER PUBLICATIONS

G. A. Clark et al., “A unified approach to time- and frequency-domain realization of FIR adaptive digital filters”, IEEE Trans. Acoust., Speech, Signal Process., Oct. 1983, vol. 31, No. 5, pp. 1073-1083.
A. Oppenheim et al. “Digital Signal Processing”, 1993, 2nd ed. Prentice-Hall Inc., Englewood Cliff, NJ.
R. M. M. Derkx et al., “New constraining method for partitioned block frequency-domain adaptive filters”, IEEE Trans. Signal Process., vol. 50, No. 3, pp. 2177-2186, 2002.
Sen M Kuo et al, “Multiple-Microphone Acoustic Echo Cancellation System With the Partial Adaptive Process”, Digital Signal Processing, Academic Press, Jan. 1, 1993, vol. 3, No. 1, doi:10.1006/DSPR.1993.1007, ISSN 1051-2004, pp. 54-63, Orlando, FL, US.
M. Luis Valero et al., “Multi-Microphone Acoustic Cancellation Using Relative Echo Transfer Functions”, IEEE Workshop on Applications of Signal Processing to Audio and Acoustic, Oct. 15-18, 2017, New Paltz, NY.
Oishi Tsuyoshi, “Office Action for JP Application No. 2019-556955”, Jan. 25, 2021, JPO, Japan.

* cited by examiner

APPARATUS AND METHOD FOR MULTICHANNEL INTERFERENCE CANCELLATION

CROSS-REFERENCES TO RELATED APPLICATIONS

This application is a continuation of copending International Application No. PCT/EP2018/060006, filed Apr. 19, 2018, which is incorporated herein by reference in its entirety, and additionally claims priority from European Applications Nos. EP 17 167 304.9, filed Apr. 20, 2017 and EP 17 196 416.6, filed Oct. 13, 2017, all of which are incorporated herein by reference in their entirety.

The present invention relates to audio signal processing, and, in particular, to an apparatus and method for reducing the complexity of multichannel interference cancellation and for low complexity multichannel interference cancellation.

BACKGROUND OF THE INVENTION

Modern hands-free communication devices employ multiple microphone signals, for, e.g., speech enhancement, room geometry inference or automatic speech recognition. These devices range from voice-activated assistants, smart-home devices and smart speakers, to smart phones, tablets or personal computers. Many smart devices, such as voice-activated assistants, smart-phones, tablets or personal computers, are equipped with loudspeakers. Considering such devices, for example, a device which also integrates at least one loudspeaker, an acoustic interference canceler is applied to each microphone's output to reduce the electroacoustic coupling.

Acoustic echo cancellation (AEC) (see, e.g., [1]) is the most widely-used technique to reduce electro-acoustic coupling between loudspeaker(s) and microphone(s) in hands-free communication set-ups. Given such a set-up, microphones acquire, in addition to the desired near-end speech, acoustic echoes and background noise. AEC uses adaptive filtering techniques (see, e.g., [2]) to estimate the acoustic impulse responses (AIRs) between loudspeaker(s) and microphone(s). Subsequently, acoustic echo estimates are computed by filtering the available loudspeaker signal with the estimated AIRs. Finally, the estimated acoustic echoes are subtracted from the microphone signals, resulting in the cancellation of acoustic echoes.

In the particular case of acoustic echo cancellation (AEC), electro-acoustic coupling is caused by the far-end speaker signal that is reproduced by the loudspeaker. Yet, in the aforementioned hands-free communication devices, it can also be caused by the device's own feedback, music, or the voice assistant. The most straightforward solution to reduce the electro-acoustic coupling between loudspeaker and microphones is to place an acoustic interference canceler at the output of each microphone (see, e.g., [3]).

Relative transfer functions model the relation between frequency-domain AIRs, commonly denoted as acoustic transfer functions (ATFs). RTFs (RTF means relative transfer function) are commonly used in the context of multi-microphone speech enhancement (see, e.g., [5], [8], [12]). Considering more related applications, the estimation of residual echo relative transfer functions was employed in [13], [14] to estimate the power spectral density of the residual echo, e.g., the acoustic echo components that remain after cancellation, of a primary channel. To enhance the estimation process, a second microphone signal is used.

The proposed method in [13], [14] estimates the relation between the primary signal after cancellation and a secondary microphone signal, providing a relation between the error in the estimation of the primary AIR and a secondary AIR. Finally, the residual echo relative transfer function is used to compute the power spectral density of the primary residual acoustic echo.

Considering the specific application of microphone array processing, several methods have been presented which aim at the complexity reduction of the entire speech enhancement algorithms, e.g. spatial filtering combined with AEC. For example, the use of a single AEC placed at the output of the spatial filter was first studied in [3], [15]. Some alternative methods which aim at integrating acoustic echo cancellation and microphone array processing have been proposed in [8], [16], [18].

As the complexity of a multi-microphone acoustic interference canceler is proportional to the number of microphones, for many modern devices, such an increment in complexity is not attainable.

It would therefore be highly appreciated, if low complexity concepts for multichannel interference cancellation would be provided.

SUMMARY

According to an embodiment, an apparatus for multichannel interference cancellation in a received audio signal including two or more received audio channels to acquire a modified audio signal including two or more modified audio channels may have: a first filter unit being configured to generate a first estimation of a first interference signal depending on a reference signal, a first interference canceller being configured to generate a first modified audio channel of the two or more modified audio channels from a first received audio channel of the two or more received audio channels depending on the first estimation of the first interference signal, a second filter unit being configured to generate a second estimation of a second interference signal depending on the first estimation of the first interference signal, and a second interference canceller being configured to generate a second modified audio channel of the two or more modified audio channels from a second received audio channel of the two or more received audio channels depending on the second estimation of the second interference signal.

According to another embodiment, a method for multichannel interference cancellation in a received audio signal including two or more received audio channels to acquire a modified audio signal including two or more modified audio channels may have the steps of: generating a first estimation of a first interference signal depending on a reference signal, generating a first modified audio channel of the two or more modified audio channels from a first received audio channel of the two or more received audio channels depending on the first estimation of the first interference signal, generating a second estimation of a second interference signal depending on the first estimation of the first interference signal, and generating a second modified audio channel of the two or more modified audio channels from a second received audio channel of the two or more received audio channels depending on the second estimation of the second interference signal.

Another embodiment may have a non-transitory digital storage medium having a computer program stored thereon to perform the method for multichannel interference cancellation in a received audio signal including two or more received audio channels to acquire a modified audio signal including two or more modified audio channels, wherein the method includes: generating a first estimation of a first interference signal depending on a reference signal, generating a first modified audio channel of the two or more modified audio channels from a first received audio channel of the two or more received audio channels depending on the first estimation of the first interference signal, generating a second estimation of a second interference signal depending on the first estimation of the first interference signal, and generating a second modified audio channel of the two or more modified audio channels from a second received audio channel of the two or more received audio channels depending on the second estimation of the second interference signal, when said computer program is run by a computer.

An apparatus for multichannel interference cancellation in a received audio signal comprising two or more received audio channels to obtain a modified audio signal comprising two or more modified audio channels according to an embodiment is provided.

The apparatus comprises a first filter unit being configured to generate a first estimation of a first interference signal depending on a reference signal.

Moreover, the apparatus comprises a first interference canceller being configured to generate a first modified audio channel of the two or more modified audio channels from a first received audio channel of the two or more received audio channels depending on the first estimation of the first interference signal.

Furthermore, the apparatus comprises a second filter unit being configured to generate a second estimation of a second interference signal depending on the first estimation of the first interference signal.

Moreover, the apparatus comprises a second interference canceller being configured to generate a second modified audio channel of the two or more modified audio channels from a second received audio channel of the two or more received audio channels depending on the second estimation of the second interference signal.

Embodiments provide concepts, e.g., an apparatus and a method, for multichannel interference cancellation using relative transfer functions.

For example for AEC, concepts according to embodiments use an estimate of a primary acoustic echo signal to compute estimates of the remaining, or secondary, acoustic echo signals. In order to do so, the relation between primary acoustic impulse responses (AIRs), e.g., the AIRs between the loudspeaker and the primary microphones, and secondary AIRs, e.g., the AIRs between the loudspeaker and secondary microphones, are identified. Subsequently, the secondary acoustic echo signals are computed by filtering a primary acoustic echo signal with the estimated relation between AIRs. Finally, cancellation is applied to each and every microphone signal. If the inter-microphone distance is small, these relations can be modeled using relatively short filters. Thus, the computational complexity can be reduced.

Moreover, a method for multichannel interference cancellation in a received audio signal comprising two or more received audio channels to obtain a modified audio signal comprising two or more modified audio channels according to an embodiment is provided.

The method comprises:

- Generating a first estimation of a first interference signal depending on a reference signal.
- Generating a first modified audio channel of the two or more modified audio channels from a first received audio channel of the two or more received audio channels depending on the first estimation of the first interference signal.
- Generating a second estimation of a second interference signal depending on the first estimation of the first interference signal. And:
- Generating a second modified audio channel of the two or more modified audio channels from a second received audio channel of the two or more received audio channels depending on the second estimation of the second interference signal.

Furthermore, a computer program is provided, wherein the computer program is configured to implement the above-described method when being executed on a computer or signal processor.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
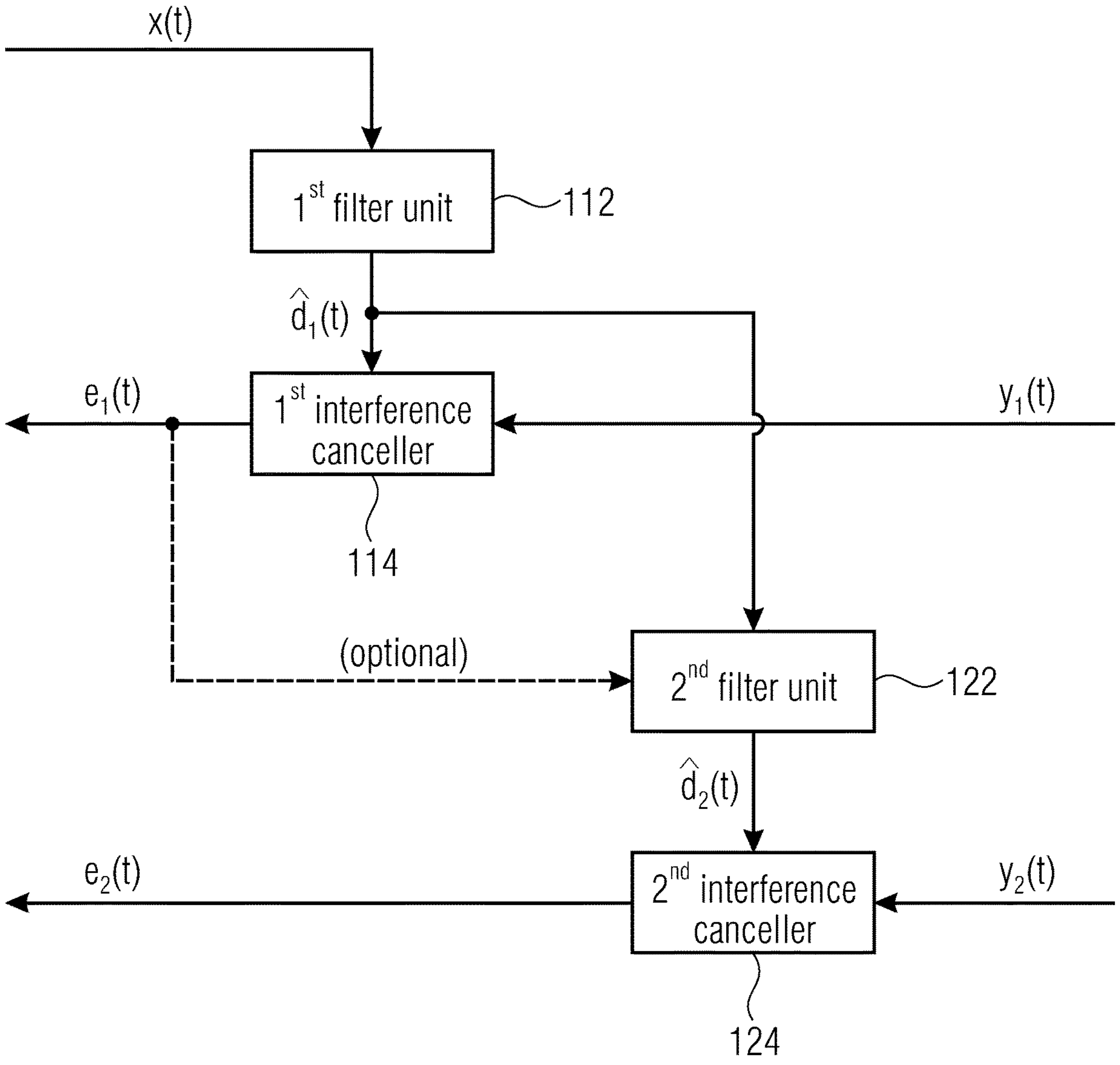
FIG. 1A illustrates an apparatus for for multichannel interference cancellation according to an embodiment.

FIG. 1A illustrates an apparatus for multichannel interference cancellation according to an embodiment.

The apparatus comprises a first filter unit 112 being configured to generate a first estimation $\hat{d}_1(t)$ of a first interference signal depending on a reference signal x(t).

Moreover, the apparatus comprises a first interference canceller 114 being configured to generate a first modified audio channel $e_1(t)$ of the two or more modified audio channels from a first received audio channel $y_1(t)$ of the two or more received audio channels depending on the first estimation $\hat{d}_1(t)$ of the first interference signal.

Furthermore, the apparatus comprises a second filter unit 122 being configured to generate a second estimation $\hat{d}_2(t)$ of a second interference signal depending on the first estimation $\hat{d}_1(t)$ of the first interference signal.

Moreover, the apparatus comprises a second interference canceller 124 being configured to generate a second modified audio channel $e_2(t)$ of the two or more modified audio channels from a second received audio channel $y_2(t)$ of the two or more received audio channels depending on the second estimation $\hat{d}_2(t)$ of the second interference signal.

Embodiments are based on the finding that the first estimation of the first interference signal may be used to generate the second estimation of a second interference signal. Reusing the first estimation of the first interference signal for determining the second estimation of the second interference signal reduces computational complexity compared to solutions that generate the second estimation of the second interference signal by using the reference signal instead of using the first estimation of the first interference signal.

Some of the embodiments relate to acoustic echo cancellation (AEC).

In an embodiment, the first estimation of the first interference signal may, e.g., be a first estimation of a first acoustic echo signal, the second estimation of the second interference signal is a second estimation of a second acoustic echo signal.

The first interference canceller 114 may, e.g., be configured to conduct acoustic echo cancellation on the first received audio channel (e.g., by subtracting the first estimation of the first acoustic echo signal from the first received audio channel) to obtain the first modified audio channel.

The second interference canceller 124 may, e.g., be configured to conduct acoustic echo cancellation on the second received audio channel (e.g., by subtracting the second estimation of the second acoustic echo signal from the second received audio channel) to obtain the second modified audio channel.

Figure 1B:
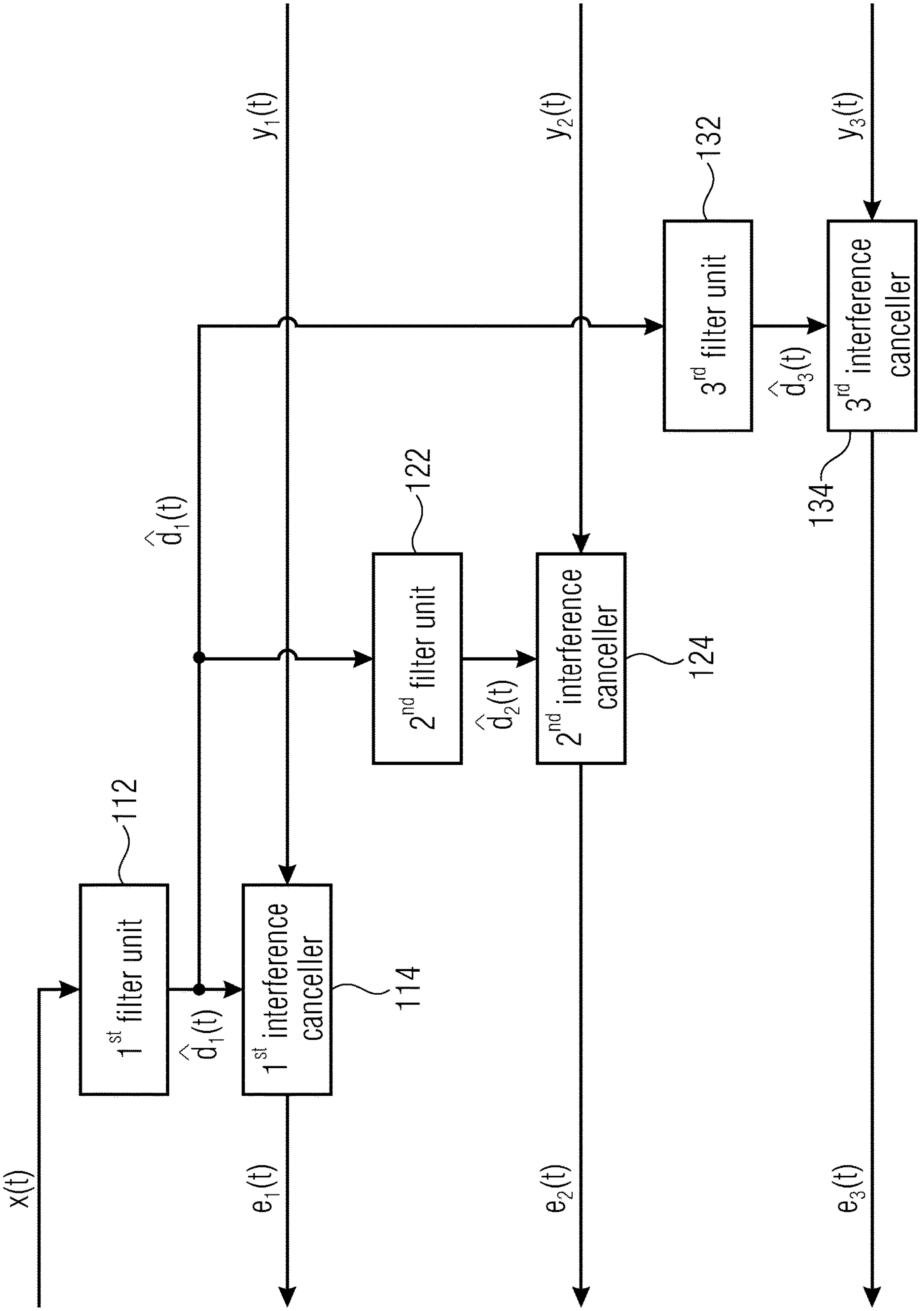
FIG. 1B illustrates an apparatus for for multichannel interference cancellation according to another embodiment.

FIG. 1B illustrates an apparatus for for multichannel interference cancellation according to another embodiment.

Compared to the apparatus of FIG. 1A, the apparatus of FIG. 1B further comprises a third filter unit 132 and a third interference canceller 134.

In the embodiment of FIG. 1B, the received audio signal comprises three or more received audio channels, and the modified audio signal comprises three or more modified audio channels.

The third filter unit 132 is configured to generate a third estimation $\hat{d}_3(t)$ of a third interference signal depending on the first estimation $\hat{d}_1(t)$ of the first interference signal.

The third interference canceller 134 is configured to generate a third modified audio channel $e_3(t)$ of the three or more modified audio channels from a third received audio channel $y_3(t)$ of the three or more received audio channels depending on the third estimation $\hat{d}_3(t)$ of the third interference signal.

Figure 1C:
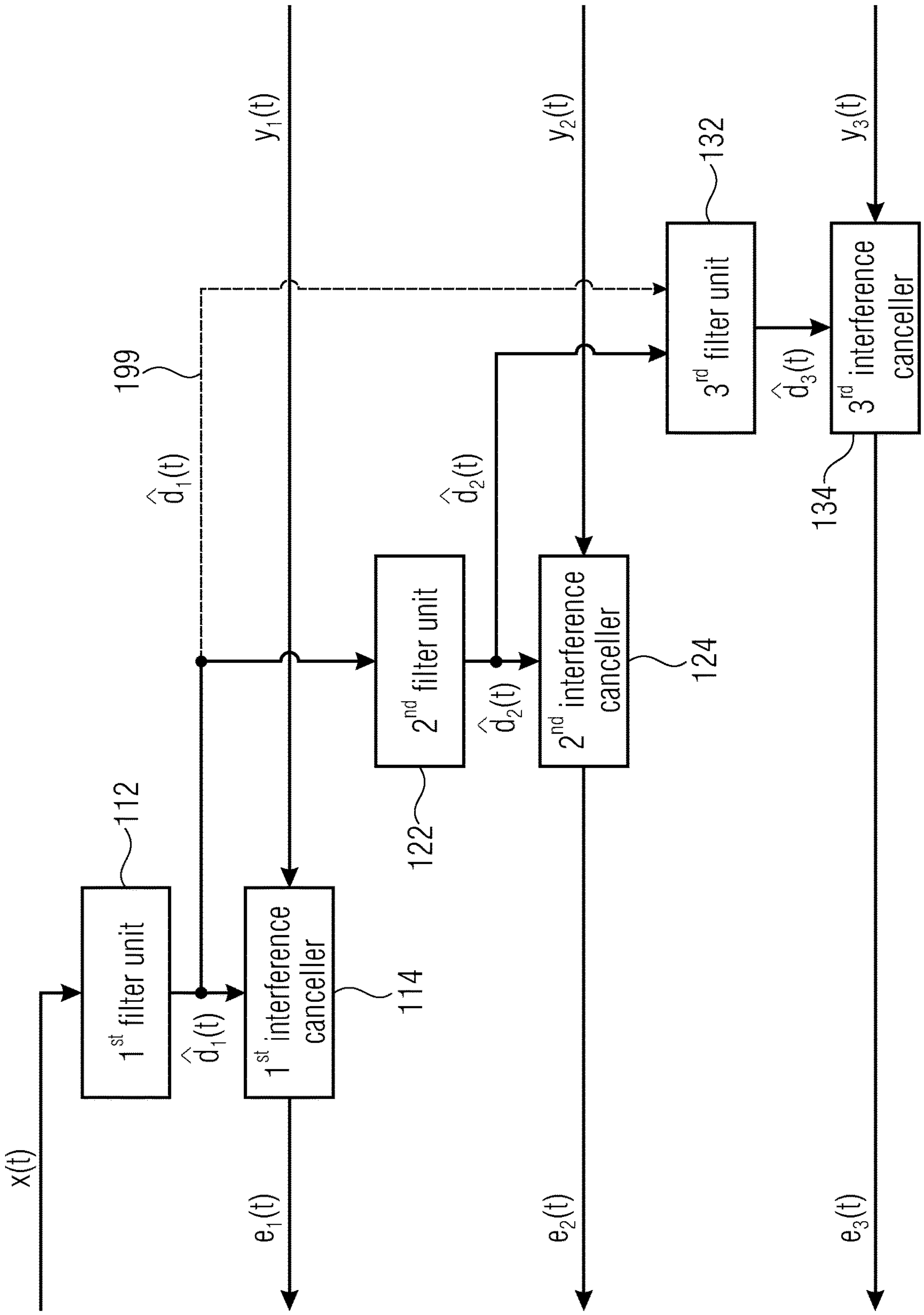
FIG. 1C illustrates an apparatus for for multichannel interference cancellation according to a further embodiment.

FIG. 1C illustrates an apparatus for for multichannel interference cancellation according to a further embodiment.

Compared to the apparatus of FIG. 1A, the apparatus of FIG. 1C further comprises a third filter unit 132 and a third interference canceller 134.

In the embodiment of FIG. 1C, the received audio signal comprises three or more received audio channels, and the modified audio signal comprises three or more modified audio channels.

The third filter unit 132 is configured to generate a third estimation $\hat{d}_3(t)$ of a third interference signal depending on the second estimation $\hat{d}_2(t)$ of the second interference signal. Thus, the embodiment of FIG. 1C differs from the embodiment of FIG. 1B in that generating the third estimation $\hat{d}_3(t)$ of the third interference signal is conducted depending on the second estimation $\hat{d}_2(t)$ of the second interference signal instead of depending on the first estimation $\hat{d}_1(t)$ of the first interference signal.

The third interference canceller 134 is configured to generate a third modified audio channel $e_3(t)$ of the two or more modified audio channels from a third received audio channel $y_3(t)$ of the two or more received audio channels depending on the third estimation $\hat{d}_3(t)$ of the third interference signal.

In other embodiments (which implement the optional dashed line 199 in FIG. 1C), the third filter unit 132 is configured to generate a third estimation $\hat{d}_3(t)$ of a third interference signal depending on the second estimation $\hat{d}_2(t)$ of the second interference signal and depending on the first estimation $\hat{d}_1(t)$ of the first interference signal.

Figure 2:
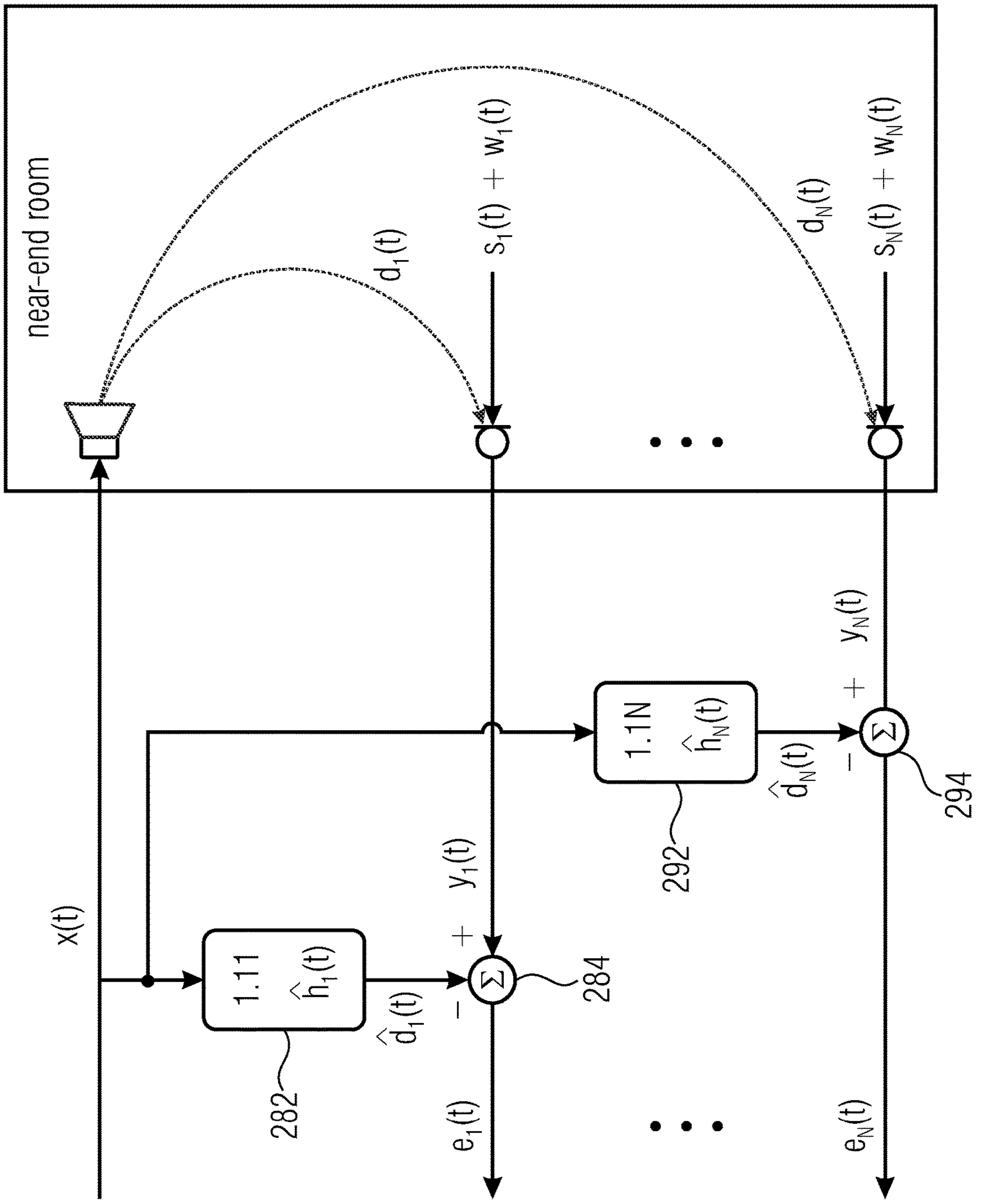
Fig. 2 (PRIOR ART)
FIG. 2 illustrates Multi-microphone AEC.

FIG. 2 illustrates multi-microphone AEC according to conventional technology. In that conventional technology approach, a first filter unit 282 is used to generate a first estimation $\hat{d}_1(t)$ of a first interference signal from a reference signal x(t).

A first interference canceller 284 then generates a first modified audio channel $e_1(t)$ from a first received audio channel $y_1(t)$ of the two or more received audio channels depending on the first estimation $\hat{d}_1(t)$ of the first interference signal.

In the conventional technology approach of FIG. 2, a second filter unit 292 generates a second estimation $\hat{d}_N(t)$ of a second interference signal from the reference signal x(t) that was also used by the first filter unit 282.

A second interference canceller 294 then generates a second modified audio channel $e_N(t)$ from a second received audio channel $y_N(t)$ of the two or more received audio channels depending on the second estimation $\hat{d}_N(t)$ of the second interference signal.

Figure 3:
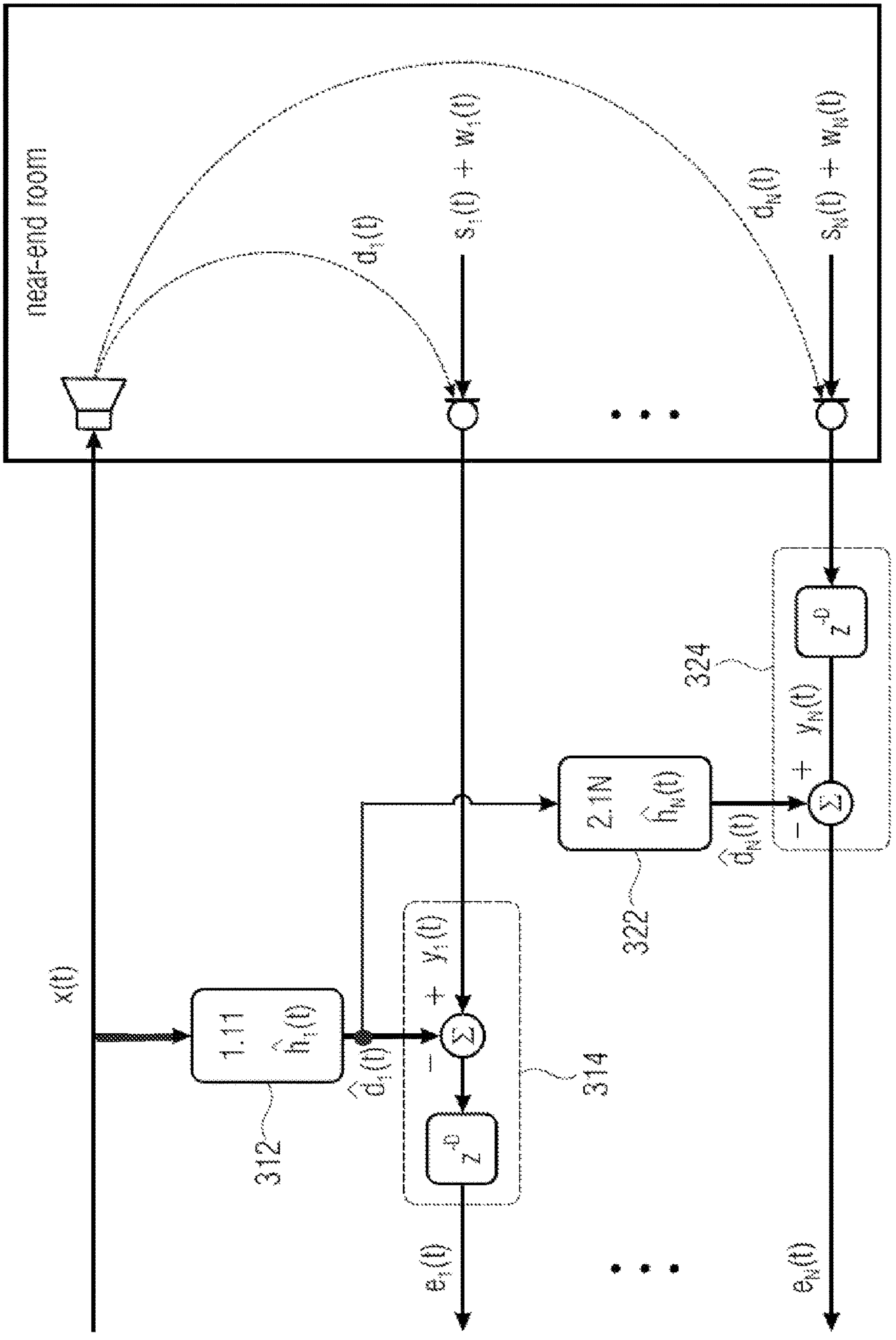
FIG. 3 illustrates multi-microphone AEC according to an embodiment.

Some embodiments reduce the complexity of multi-microphone Acoustic Echo Cancellation (AEC) that is depicted in FIG. 2, by using a relative transfer function (RTF) based approach, as depicted in FIG. 3. Relative transfer functions are described in [4], [7].

FIG. 3 illustrates multi-microphone Acoustic Echo Cancellation (AEC) according to embodiments. In FIG. 3, a first filter unit 312 is used to generate a first estimation $\hat{d}_1(t)$ of a first interference signal from a reference signal x(t).

A first interference canceller 314 then generates a first modified audio channel $e_1(t)$ from a first received audio channel $y_1(t)$ of the two or more received audio channels depending on the first estimation $\hat{d}_1(t)$ of the first interference signal.

The apparatus of FIG. 3 may differ from FIG. 2, for example, in that, a second filter unit 322 generates a second estimation $\hat{d}_N(t)$ of a second interference signal depending on the first estimation $\hat{d}_1(t)$ of the first interference signal that was generated by the first filter unit 312.

A second interference canceller 324 then generates a second modified audio channel $e_N(t)$ from a second received audio channel $y_N(t)$ of the two or more received audio channels depending on the second estimation $\hat{d}_N(t)$ of the second interference signal.

Some embodiments reduce the complexity of multi-microphone Acoustic Echo Cancellation (AEC) that is depicted in FIG. 2, by using a relative transfer function (RTF) based approach, as depicted in FIG. 3. Relative transfer functions are described in [4], [7].

Embodiments use an estimate of a primary interference signal, to compute estimates of the remaining, or secondary, interference signals. To estimate a primary interference signal, a primary filter, which characterizes the relation between a reference signal and a primary received signal, is identified. An estimate of a primary interference signal is then obtained by filtering a reference signal with an estimate of a primary filter. Afterwards, the secondary filters, e.g. the filters that characterize the relation between an estimated primary interference signal and the secondary received signals, are identified. Subsequently, estimates of the secondary interference signals are computed by filtering an estimate of a primary interference signal with the estimated secondary filters. Finally, cancellation is applied to reduce the electro-acoustic coupling. If the distance between microphones is small, secondary filters are shorter than primary filters (see, e.g., [10], [19]), which leads to the reduction of the computational complexity.

Some embodiments are used for acoustic echo cancellation. To this end, FIG. 3 depicts a hands-free communication scenario with one loudspeaker (one transmitter) and N microphones (receivers). In this particular case, the reference signal is the loudspeaker signal x(t), the primary microphone signal is $y_1(t)$, without loss of generality, and t denotes the discrete time index. Further, an estimate of the primary filter is denoted as $\hat{h}_1(t)$, being an estimate of the primary acoustic echo (interference) signal $\hat{d}_1(t)$, and the signal after cancellation $e_1(t)=y_1(t)-\hat{d}_1(t)$. As it can be observed, a secondary acoustic echo signal $\hat{d}_N(t)$ is computed by filtering an estimate of the primary acoustic echo signal $\hat{d}_1(t)$ with an estimate of a secondary filter $\hat{a}_N(t)$. It should be noted that a delay of D≥0 samples is introduced to the secondary microphone signal. This is done to ensure that D non-causal coefficients of the secondary filters are estimated. In case the microphones need to be synchronized, the primary signal after cancellation also needs to be delayed by D samples. In contrast, classical interference cancellation schemes (as depicted in FIG. 2), compute estimates of the N received signals by filtering the reference x(t) signal with N estimated primary filters.

In the following, a step-by-step approach according to some of the embodiments is provided:

1.) A primary interference signal is estimated using a reference signal. In the specific application of acoustic echo cancellation, the former is the acoustic echo signal, and the latter is the loudspeaker signal. To do so:
   1.1.) a primary filter, which characterizes the relation between a reference signal and a primary receiver signal, this being either
      (a) a single receiver signal,
      (b) a linear combination of receiver signals,
   is identified by using, e.g., adaptive filtering techniques.
   1.2.) a reference signal is filtered with an estimate of a primary filter to compute an estimate of a primary interference signal.
   1.3.) interference cancellation is applied by subtracting an estimate of a primary interference signal from a primary received signal, this being either
      (a) a single receiver signal.
      (b) a linear combination of receiver signals.
2.) A secondary interference signal is estimated based on an estimate of a primary interference signal. To do so:
   2.1.) a secondary filter, which characterizes the relation between an estimate of a primary interference signal and a secondary received signal, is identified by, e.g.,
      i.) optimization of a cost-function or error criterion (e.g. mean-squared error, (weighted) least-squared error, etc. . . . )
      ii.) an adaptive filtering technique in time, frequency or sub-band domain.
   using a secondary receiver signal or a secondary signal after cancellation, and an estimate of a primary interference signal. (The secondary filter may, e.g., be considered as a filter configuration.)
   2.2.) an estimate of a primary interference signal is filtered with an estimate of a secondary filter, to compute an estimate of a secondary interference signal.
   2.3.) interference cancellation is applied by subtracting an estimate of a secondary interference signal from a secondary receiver signal.
3.) Repeat 2. for each secondary interference signal.
4.) Repeat 1., 2. and 3. for each reference signal.
5.) Where a transmitter is a loudspeaker and a receiver is a microphone.
6.) Where an estimate of a secondary interference signal can be used as an estimate of a primary interference signal leading to a cascaded configuration.
7.) Where for more than two receivers, subsets of receivers can be defined, each of them having a primary receiver.

Further embodiments apply only some of the steps above and/or apply the steps in a different order.

In the following, embodiments which use STFT-domain adaptive filters are described (STFT means short-time Fourier transform).

Given a hands-free communication set-up with one loudspeaker and N microphones, the n-th microphone signal can be expressed in the STFT domain as $$Y_n(\ell, k) = D_n(\ell, k) + R_n(\ell, k),\ n \in \{1, \ldots, N\}, \tag{1}$$

where l and k are, respectively, the time frame and frequency indexes. Further, $R_n$(l,k) is the near-end signal, which comprises near-end speech and background noise, and $D_n$(l,k) is the n-th acoustic echo. The latter is the result of the loudspeaker signal X(l,k) being propagated through the room, and acquired by the n-th microphone. Its exact formulation in the STFT domain (see, e.g., [20]) is $$D_n(\ell, k) = \sum_{b=-\infty}^{\infty} h_n^H(b, k)x(\ell - b), \tag{2}$$

where x(l)=[X(l,0), . . . , X(l,K−1)]$^T$, superscripts $\bullet^T$ and $\bullet^H$ denote transpose and conjugate transpose, respectively, and K is the transform length. Further, the b-th partition of the n-th AETF is $h_n$(b,k)=[$H_n$(b,k,0), . . . , $H_n$(b,k,K−1)]$^T$, which is a vector containing all frequency dependencies $H_n$(b,k,k'), with k'∈{0, . . . , K−1} (AETF means acoustic echo transfer function).

It should be noted that AETFs in the STFT domain, which are extensively analyzed in [20], are non-causal. Moreover, the number of partitions, or input frames, that may be used to estimate L AIR coefficients is $B=\lceil (L+K-1)/R \rceil + \lceil K/R \rceil - 1$, where R denotes the frameshift between subsequent input frames. Due to the non-causality of the AETFs, $B_{nc}=\lceil K/R \rceil - 1$ look-ahead frames of X(l,k) are needed to compute the echo signals.

Figure 4:
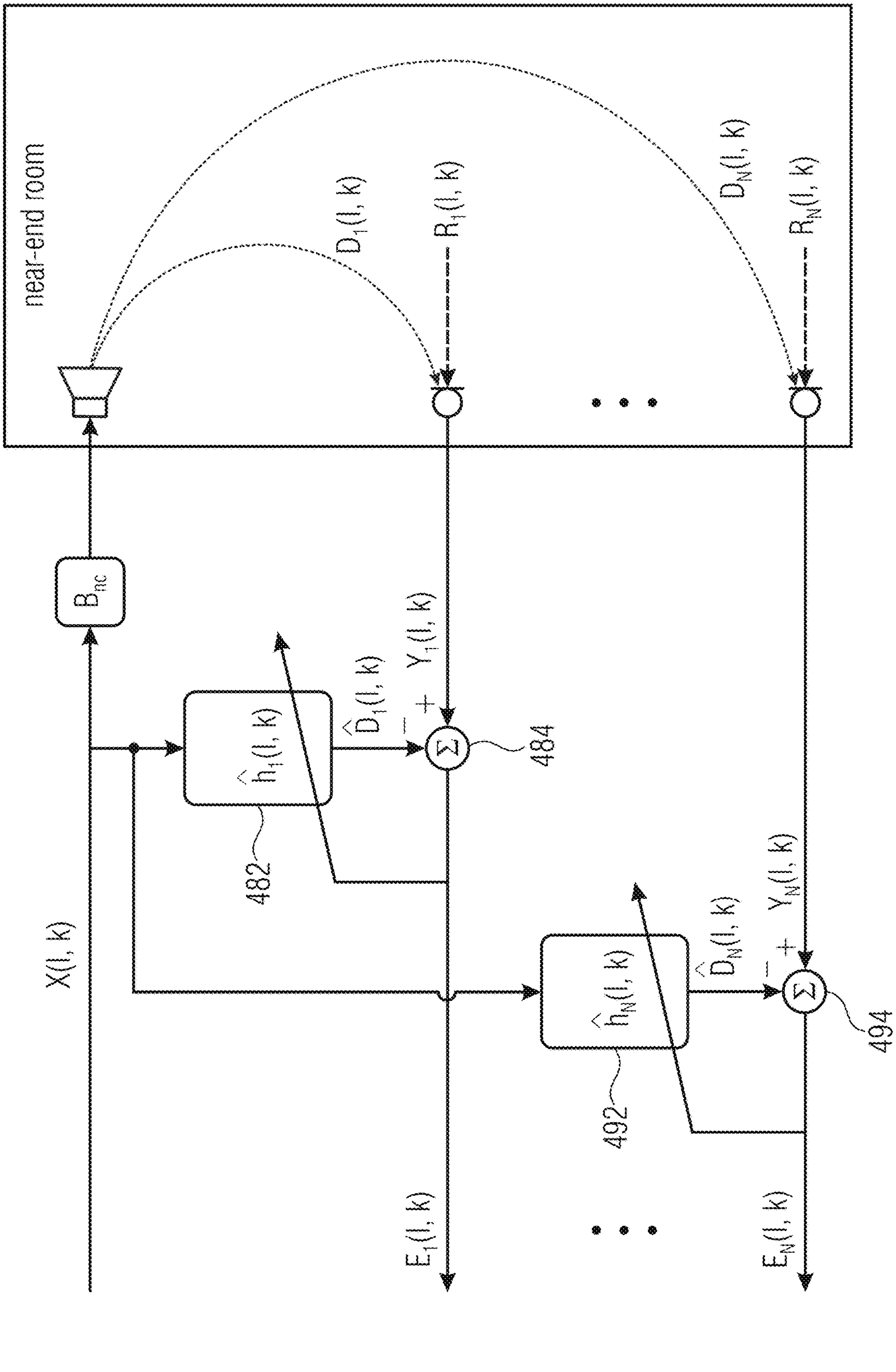
FIG. 4 illustrates multi-microphone AEC in the STFT domain.

Let us assume that the frequency selectivity of the STFT analysis and synthesis windows is sufficient such that the frequency dependencies can be neglected. In addition, for notational brevity, according to embodiments, it is assumed that a delay of $B_{nc}$ frames is introduced to the reproduction path as depicted in FIG. 4. In practice, the capturing path is commonly delayed instead, see, e.g., [7], [20].

The signals in FIG. 4 are signals in a transform domain. In particular, the signals in FIG. 4 are signals in the short-time Fourier transform domain (STFT domain).

In FIG. 4, a first filter unit 482 is used to generate a first estimation $\hat{D}_1$(l,k) of a first interference signal from a reference signal X(l,k).

A first interference canceller 484 then generates a first modified audio channel $E_1$(l,k) from a first received audio channel $Y_1$(l,k) of the two or more received audio channels depending on the first estimation $\hat{D}_1$(l,k) of the first interference signal.

In the approach of FIG. 4, a second filter unit 492 generates a second estimation $\hat{D}_N$(l,k) of a second interference signal from the reference signal X(l,k) that was also used by the first filter unit 482.

A second interference canceller 494 then generates a second modified audio channel $E_N$(l,k) from a second received audio channel $Y_N$(l,k) of the two or more received audio channels depending on the second estimation $\hat{D}_N$(l,k) of the second interference signal.

FIG. 4 illustrates multi-microphone AEC in the STFT domain. In practice, the capturing path is commonly delayed instead, see, e.g., [7], [20]. Now, by using the convolutive transfer function (CTF) approximation (see, e.g., [7]) it is possible to write $$D_n(\ell, k) \approx \sum_{b=-B_{nc}}^{B-B_{nc}-1} H_n^*(b, k)X(\ell - B_{nc} - b, k), \tag{3}$$

where •* denotes complex conjugation, and, for brevity, $H_n$(b,k)=$H_n$(b,k,k). Adaptive algorithms in AEC are driven by the error signal after cancellation, e.g., $$E_n(\ell, k) = Y_n(\ell, k) - \hat{D}_n(\ell, k) = Y_n(\ell, k) - \hat{h}_n^H(\ell, k)x(\ell, k), \tag{4}$$

where $\hat{\bullet}$ is used to denote estimates, $\hat{h}_n$(l,k)=[$\hat{H}_n$(l,−$B_{nc}$,k), . . . , $\hat{H}_n$(l,B−$B_{nc}$−1,k)]$^T$ and x(l,k)=[X(l,k), . . . , X(l−B+1,k)]$^T$. Superscript $^H$ indicates Hermitian. Most adaptive filters used in AEC are of gradient descent type (see, e.g., [2]), thus a generic update equation is given by $$\hat{h}_n(\ell + 1, k) = \hat{h}_n(\ell, k) + M_n(\ell, k)x(\ell, k)E_n^*(\ell, k), \tag{5}$$

where $M_n$(l,k) is the step-size matrix of the adaptive filter, whose formulation depends on the specific adaptive algorithm used.

In the following, the usage of relative echo transfer functions according to embodiments is described.

Due to computational complexity restrictions, the implementation of multiple-microphone AEC as depicted in FIG. 4 is not always feasible.

Figure 5:
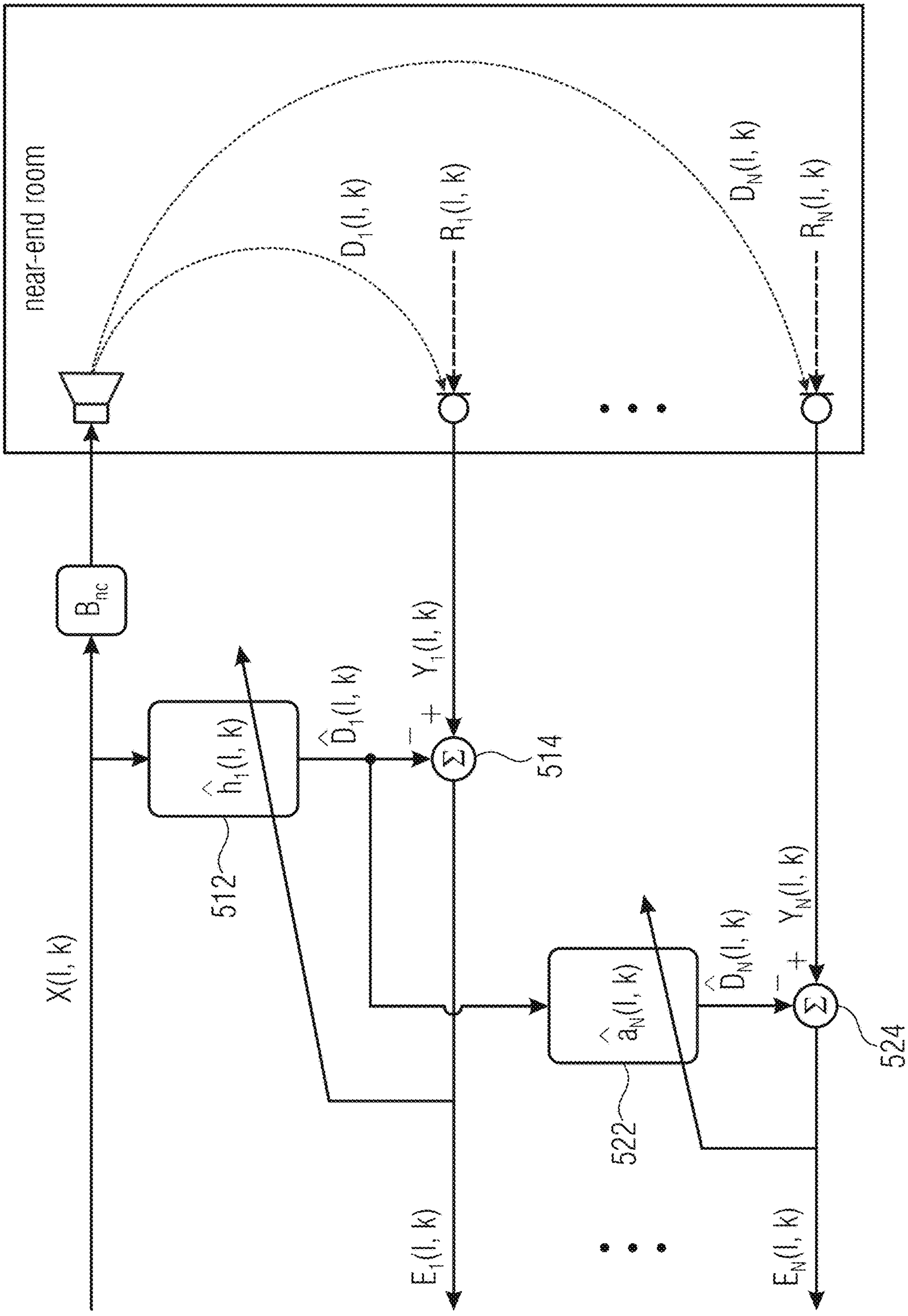
FIG. 5 illustrates multi-microphone AEC in the STFT domain according to an embodiment.

According to embodiments, it is proposed to reduce the complexity by using a RETF-based approach, as depicted in FIG. 5 (RETF means relative echo transfer function). FIG. 5 illustrates multi-microphone AEC in the STFT domain according to an embodiment.

Again, the signals in FIG. 5 are signals in a transform domain. In particular, the signals in FIG. 5 are signals in the short-time Fourier transform domain (STFT domain).

In FIG. 5, a first filter unit 512 is used to generate a first estimation $\hat{D}_1$(l,k) of a first interference signal from a reference signal X(l,k).

A first interference canceller 514 then generates a first modified audio channel $E_1$(l,k) from a first received audio channel $Y_1$(l,k) of the two or more received audio channels depending on the first estimation $\hat{D}_1$(l,k) of the first interference signal.

The apparatus of FIG. 5 now differs from FIG. 4 in that, a second filter unit 522 generates a second estimation $\hat{D}_N$(l,k) of a second interference signal depending on the first estimation $\hat{D}_1$(l,k) of the first interference signal that was generated by the first filter unit 512.

A second interference canceller 524 then generates a second modified audio channel $E_N$(l,k) from a second received audio channel $Y_N$(l,k) of the two or more received audio channels depending on the second estimation $\hat{D}_N$(l,k) of the second interference signal.

In embodiments, the second filter unit 122 may, e.g., be configured to determine a filter configuration depending on the first estimation of the first interference signal and depending on the second received audio channel, and the second filter unit 122 may, e.g., configured to determine the second estimation of the second interference signal depending on the first estimation of the first interference signal and depending on the filter configuration.

For example, the second filter unit 122 is configured to determine the filter configuration by minimizing a cost function or by minimizing an error criterion, for example, by minimizing a mean-square error.

In the following, such filter configurations to be determined, may, for example, be $A_n$(p,k) and/or $a_n$(k) and/or $$\hat{a}_n^{opt}(\ell, k).$$

The problem formulation is derived assuming that the filters are time-invariant, while the estimates are the ones that vary in time.

A particular example for such an embodiment is provided in the following.

Without loss of generality, the primary echo signal is denoted as $D_1$(l,k)—defined as in (3). Under the previously made assumptions on the frequency dependencies, it is possible to write, $$D_n(\ell, k) = \sum_{p=-\infty}^{\infty} A_n^*(p, k)D_1(\ell - p, k),\ n \in \{2, \ldots, N\} \tag{6}$$

where $A_n$(p,k) is the p-th partition of the n-th relative echo transfer function (RETF). Provided that the distance between primary and secondary microphones is relatively small, it is possible to assume that the non-causal partitions of $A_n$(p,k) ∀n are negligible. It is worth mentioning that a few non-causal time-domain coefficients are nevertheless modeled by $A_n$(0,k). Under this assumption, no look-ahead is needed, and, consequently, no additional delay is introduced.

Finally, using the CTF approximation leads to $$D_n(\ell, k) \approx \sum_{p=0}^{P-1} A_n^*(p, k)D_1(\ell - p, k),\ n \in \{2, \ldots, N\} \tag{7}$$

where P is the number of RETF partitions.

As $D_1$(l,k) is not observable, according to embodiments, it is proposed to replace $D_1$(l,k) by $\hat{D}_1$(l,k) in formula (7) that can be obtained using a state-of-the-art AEC. To estimate $A_n$(p,k)

$\forall$p, according to embodiments, the error signal is minimized:

$$E_n(\ell, k) = Y_n(\ell, k) - \hat{a}_n^H(\ell, k)\hat{d}_1(\ell, k), \tag{8}$$

where $\hat{a}_n(l,k)=[\hat{A}_n(l,0,k), \ldots, \hat{A}_n(l,P-1,k)]^T$ of is the n-th stacked vector of RETF partitions, and $\hat{d}_1(l,k)=[\hat{D}_1(l,k), \ldots, \hat{D}_1(l-P+1,k)]^T$. The optimum filter in the mean-square-error sense, which is obtained by minimizing the quadratic cost-function $J(l,k)=E\{|E_n(l,k)|^2\}$, is equal to $$\hat{a}_n^{opt}(\ell, k) = \Psi_1(\ell, k)^{-1}\psi_{1n}(\ell, k), \tag{9}$$

where $\psi_1(l,k)$ is the covariance matrix of $\hat{d}_1(l,k)$, and $\psi_{1n}(l,k)$ is the cross-correlation vector between $\hat{d}_1(l,k)$ and $Y_n(l,k)$, e.g., $$\Psi_1(\ell, k) = E\left\{\hat{d}_1(\ell, k)\hat{d}_1^H(\ell, k)\right\},$$
$$\psi_{1n}(\ell, k) = E\left\{\hat{d}_1(\ell, k)Y_n^*(\ell, k)\right\},$$

where E{•} denotes mathematical expectation. It should be noted that $$\psi_{1n}(\ell, k) = E\left\{\hat{d}_1(\ell, k)D_n^*(\ell, k)\right\},$$

under the assumption that $$E\left\{\hat{d}_1(\ell, k)R_n^*(\ell, k)\right\} = 0.$$

Meaning that $$\hat{a}_n^{opt}(\ell, k)$$

models the relation between the estimated primary AETF and the n-th secondary one. For instance, considering the trivial case B=P=1, with $B_{nc}=0$, e.g., the multiplicative transfer function approximation (see, e.g., [21]), given which the n-th estimated RETF is equal to $$\hat{A}_n^{opt}(\ell, 0, k) = \hat{H}_1(\ell, 0, k)^{-1}H_n(\ell, 0, k) \tag{10}$$

that, once the primary acoustic echo canceler has converged, is equal to $A_n(l,0,k)$ as defined in (7).

Compared to the problem of estimating RTFs from noisy observations (see, e.g., [4], [7], [22]) in our formulation there is no additional bias due to noise components that are correlated across channels.

Moreover, as the loudspeaker signal is known, the implementation of voice activity detectors (VADs) to control the estimation process is greatly simplified. In contrast, a double-talk detector is needed due to the fact that in practice $$E\left\{\hat{d}_1^*(\ell, k)R_n(\ell, k)\right\}$$

is approximated by $$\frac{1}{T}\sum_{t=0}^{T-1}\hat{d}_1^*(\ell - t, k)R_n(\ell - t, k),$$

and, consequently, the previously made assumption on the statistical relation between $\hat{d}_1(l,k)$ and $R_n(l,k)$ does not always hold.

In the following, embodiments which use adaptive RETF estimation are provided.

In such embodiments, the second filter unit 522 of FIG. 5 may, e.g., be configured to determine the filter configuration for a second time index using a step-size matrix. For example, the second filter unit 522 of FIG. 5 may, e.g., be configured to determine the filter configuration depending on the filter configuration for a first time index that precedes the second time index in time, depending on the first estimation of the first interference signal for the first time index, and depending on a sample of the second modified audio channel for the first time index.

In particular embodiments, the second filter unit 522 may, e.g., be configured to determine the filter configuration for the second time index according to $$\hat{a}_n(\ell + 1, k) = \hat{a}_n(\ell, k) + C_n(\ell, k)\hat{d}_1(\ell, k)E_n^*(\ell, k)$$

wherein l+1 indicates the second time index, and wherein l indicates the first time index, and wherein k indicates a frequency index, wherein $\hat{a}_n(l+1,k)$ is the filter configuration for the second time index, and wherein $\hat{a}_n(l,k)$ is the filter configuration for the first time index, wherein $\hat{d}_1(l,k)$ is the first estimation of the first interference signal for the first time index, wherein $$E_n^*(\ell, k)$$

is the second modified audio channel for the first time index, and wherein $C_n(l,k)$ is a step-size matrix (for example, an inverse of a covariance matrix of $\hat{d}_1(l,k)$).

Described in more detail, adaptive filters can be used to track slowly time-varying RETFs. Due to the fact that $\hat{d}_1(l,k)$ is an estimate of the echo signal acquired by the primary microphone, it cannot be assumed to be uncorrelated across time. More precisely, the off-diagonals of $\psi_1(l,k)$ are not negligible if the STFT windows are short, or if the overlap between them is large. Taking this into consideration, Newton's method (see, e.g., [2]), $$\hat{a}_n(\ell + 1, k) = \hat{a}_n(\ell, k) + \eta\Psi_1(\ell, k)^{-1}\hat{d}_1(\ell, k)E_n^*(\ell, k), \tag{11}$$

ensures a fast and stable convergence towards the optimum filter. In (11), $\eta$ is a fixed step-size that is used to control the adaptation process. In practice, the covariance matrix $\psi_1/(l, k)$ is approximated by averaging over time, e.g., by using a first-order recursive filter:

$$\tilde{\Psi}_1(\ell, k) = \beta\tilde{\Psi}_1(\ell-1, k) + (1-\beta)\hat{d}_1(\ell, k)\hat{d}_1^H(\ell, k),$$

where time averages are denoted by $\tilde{\bullet}$, and β is the forgetting factor.

In the following, the performance evaluation is described.

To evaluate the proposed approach, three sets of experiments were conducted, for which the simulation set-up was designed as follows. Echo signals were generated by convolving a clean speech signal with simulated AIRs. The latter were generated using the image method (see, e.g., [23]) for a room of dimensions 3×4×2.5 $m^3$, and reverberation time $T_{60}$=0.15 and 0.35 s. The length of the simulated AIRs was L=4096 taps, at a sampling frequency of $F_S$=16 kHz. The AIRs were generated for a set-up with two microphones and one loudspeaker. The baseline set-up used a distance between loudspeaker and primary microphone of $l_1$=10 cm, and between microphones of Δ=1.5 cm. The distance between loudspeaker and secondary microphone was $l_2=l_1+\Delta$cm. The impact of these parameters on the performance was also analyzed. To this end, Δ=3 cm and $l_1$=20 cm were also evaluated.

The signals were transformed to the STFT domain using Hamming analysis and synthesis windows of length K=512 with 75% overlap, thus R=128 samples. The adaptive algorithm used to estimate both the AETFs (5) and RETFs (11) was Newton's method. Thus, the stepsize matrix in (5) $M_n(l,k)=\mu\psi_x(l,k)^{-1}$. As it is realistic to assume that the loudspeaker signal is uncorrelated across time, its covariance matrix was simplified by:

$$\tilde{\Psi}_x(\ell, k) = \beta\tilde{\Psi}_x(\ell-1, k) + (1-\beta)I \odot x(\ell, k)x^H(\ell, k),$$

where ⊙ denotes element-wise multiplication, and I is the B×B identity matrix. It should be noted that in spite of this simplification, the normalization factors are still partition-dependent.

The step-size factors were μ=0.5/B and η=0.225/P, and the forgetting factor was β=0.9. Further, the adaptive filters and covariance matrices were not updated during speech pauses, and regularization was used to ensure the non-singularity of the covariance matrices. Finally, white Gaussian noise was added to the microphone signals to simulate a fixed segmental echoto-noise ratio (SegENR). To make the differences in performance noticeable, a SegENR of 60 dB was used. Three sets of experiments were conducted:

1. The AIRs generated to simulate $T_{60}$=0.15 s were truncated to length 256 taps, and used to generate the echo signals. The length of the estimated primary AIR was L=256.
2. Simulated environment with $T_{60}$=0.15 s, being the length of the estimated primary AIR L=256 taps.
3. Simulated environment with $T_{60}$=0.35 s, being the length of the estimated primary AIR L=1024 taps.

It should be recalled that the number of AETF partitions that may be used to completely estimate L AIR coefficients is $$B = B_{nc} + \left\lceil \frac{L+K-1}{R} \right\rceil,$$

thus at least K subsequent filter coefficients are partially estimated as well.

Figure 6:
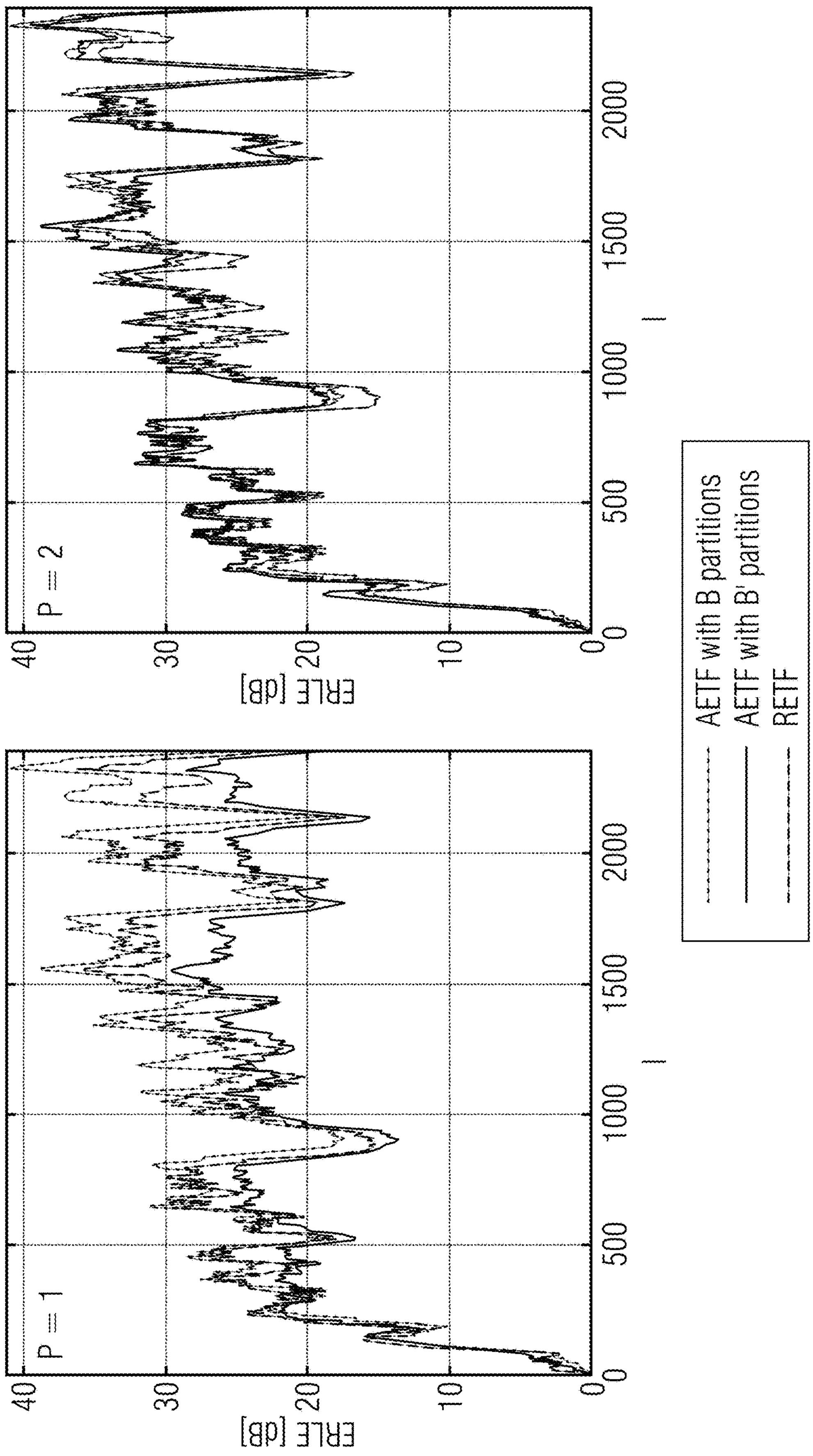
FIG. 6 depicts the results corresponding to the simulations with truncated AIRs.

In all simulations, B partitions of the primary AETF were estimated, while the secondary AETFs and RETFs were estimated using different number of partitions $B_{nc}<B'\leq B$ and P, respectively. The secondary echo signals were then obtained by convolving in the STFT domain the secondary AETFs with the loudspeaker signal, and the RETFs with the estimated primary echo signal. The echo return loss enhancement (ERLE) was used to measure the echo reduction in the secondary channel, with $$ERLE(\ell) = 10\log_{10}\frac{\|d_2(\ell)\|_2^2}{\|d_2(\ell) - \hat{d}_2(\ell)\|_2^2} \qquad (12)$$

where $\|\bullet\|_2$ is the $l_2$-norm, and $d_2(l)=[d_2(lR+1), \ldots, d_2(lR+K)]$ is the l-th frame of the secondary acoustic echo in the time domain. The outcome of these simulations is depicted in FIGS. 5 to 7, where the ERLE measures were averaged over 60 frames for clarity. In these, the proposed RETF-based AEC is compared to state-of-the-art AEC using B and $B'=B_{nc}+P$ partitions for the AETF estimation. The latter condition is included to show a comparison with AETF-based AEC using fewer causal CTF partitions, which would also reduce the overall computational complexity.

FIG. 6 depicts the results corresponding to the simulations with truncated AIRs. In particular, FIG. 6 depicts a comparison between AETF and RETF-based AEC with truncated AIRs and L=256 taps. The echo reduction obtained with P=1 and 2, left and right sub-figures, are shown for all conditions under test. It can be observed that for P=1, the RETF-based approach converges to a higher ERLE value than the AETF-based one with B' partitions, e.g., with only P causal partitions.

Further, the performance is only moderately worse than that of the AETF-based approach with B partitions. For P=2, all conditions under test perform similarly.

Figure 7A:
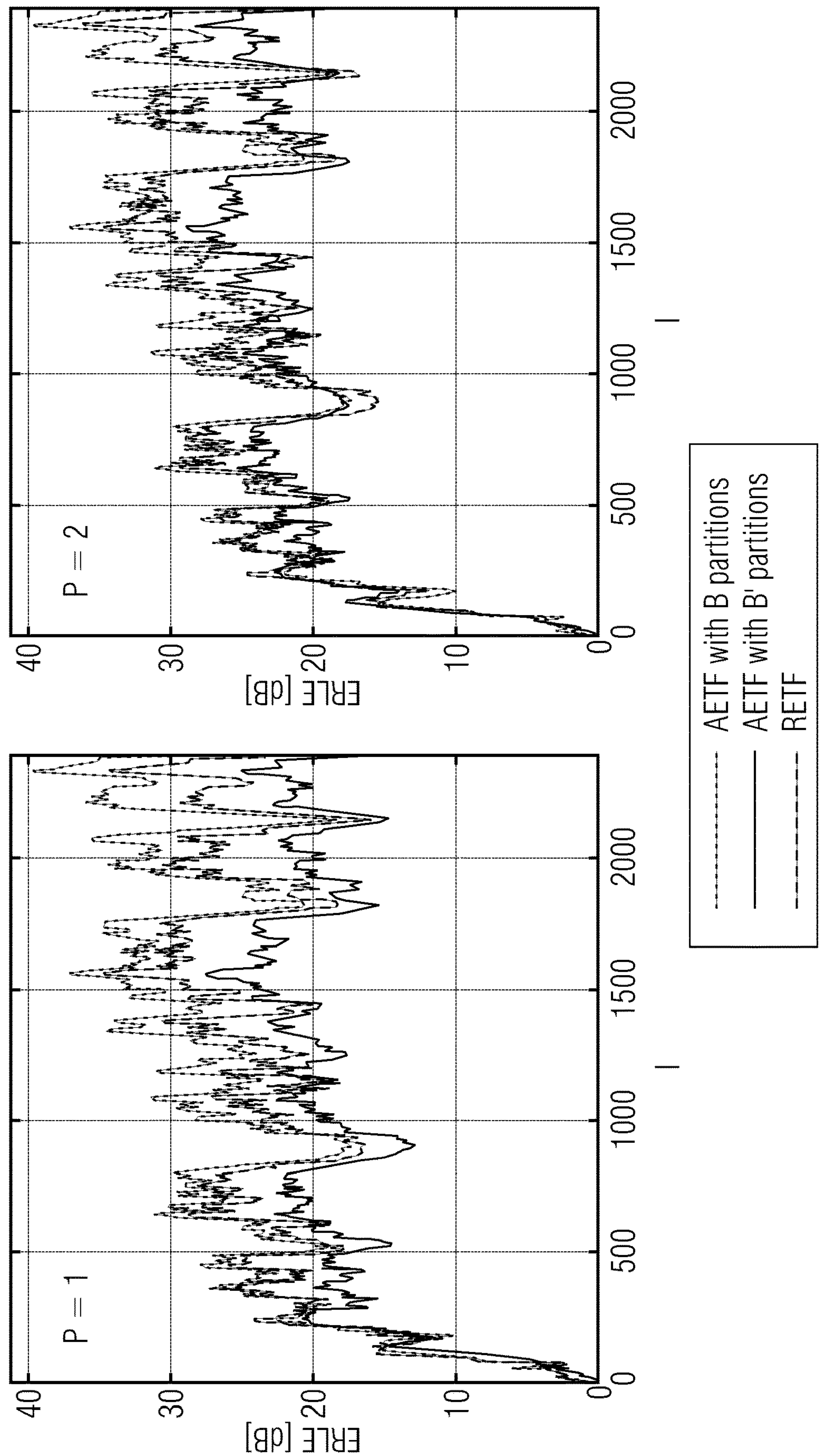
FIGS. 7A to 7C depict a comparison between AETF and RETF-based AEC with $T_{60}$=0.15 s and L=256 taps.
Figure 7B:
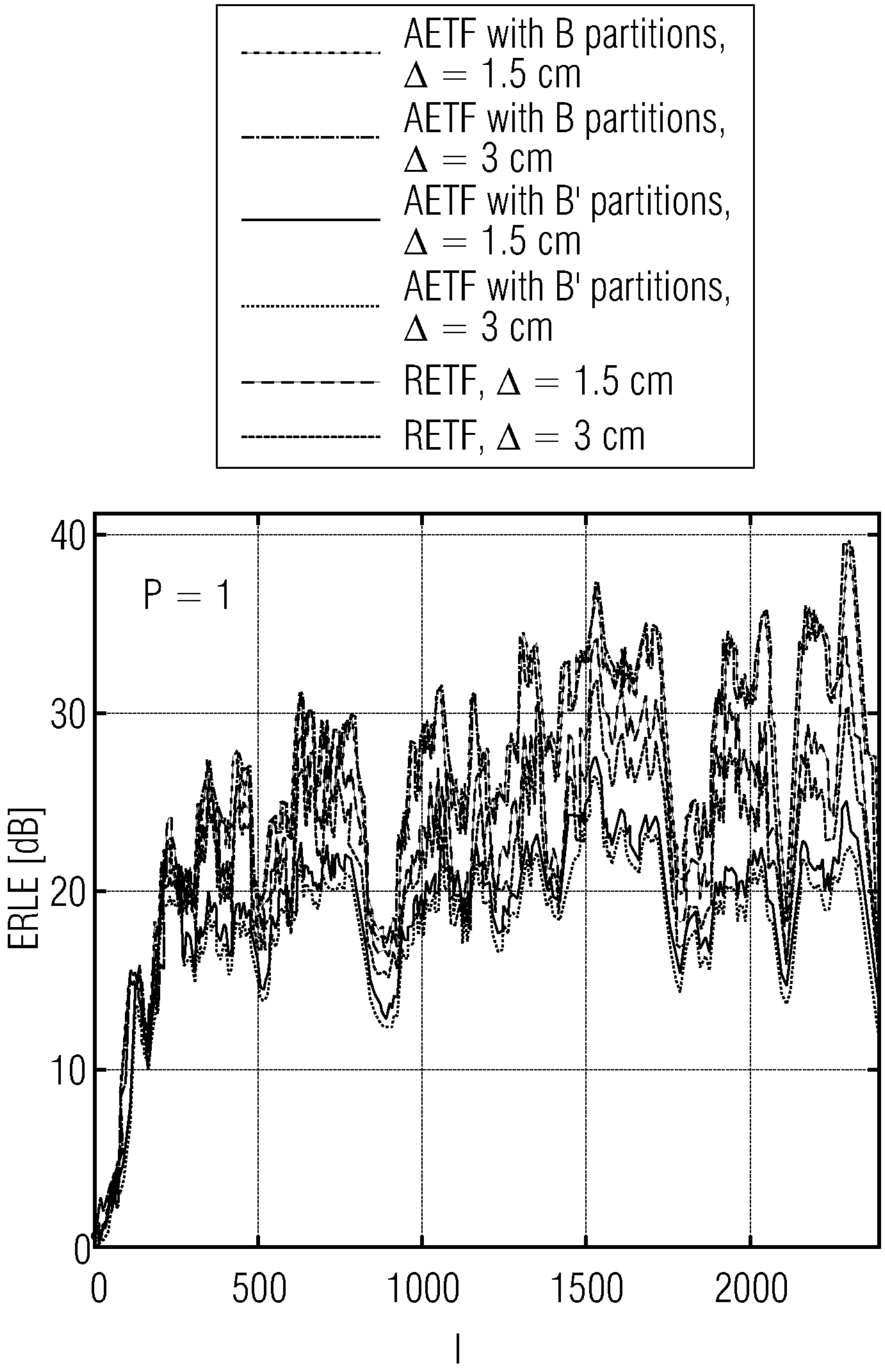
Figure 7C:
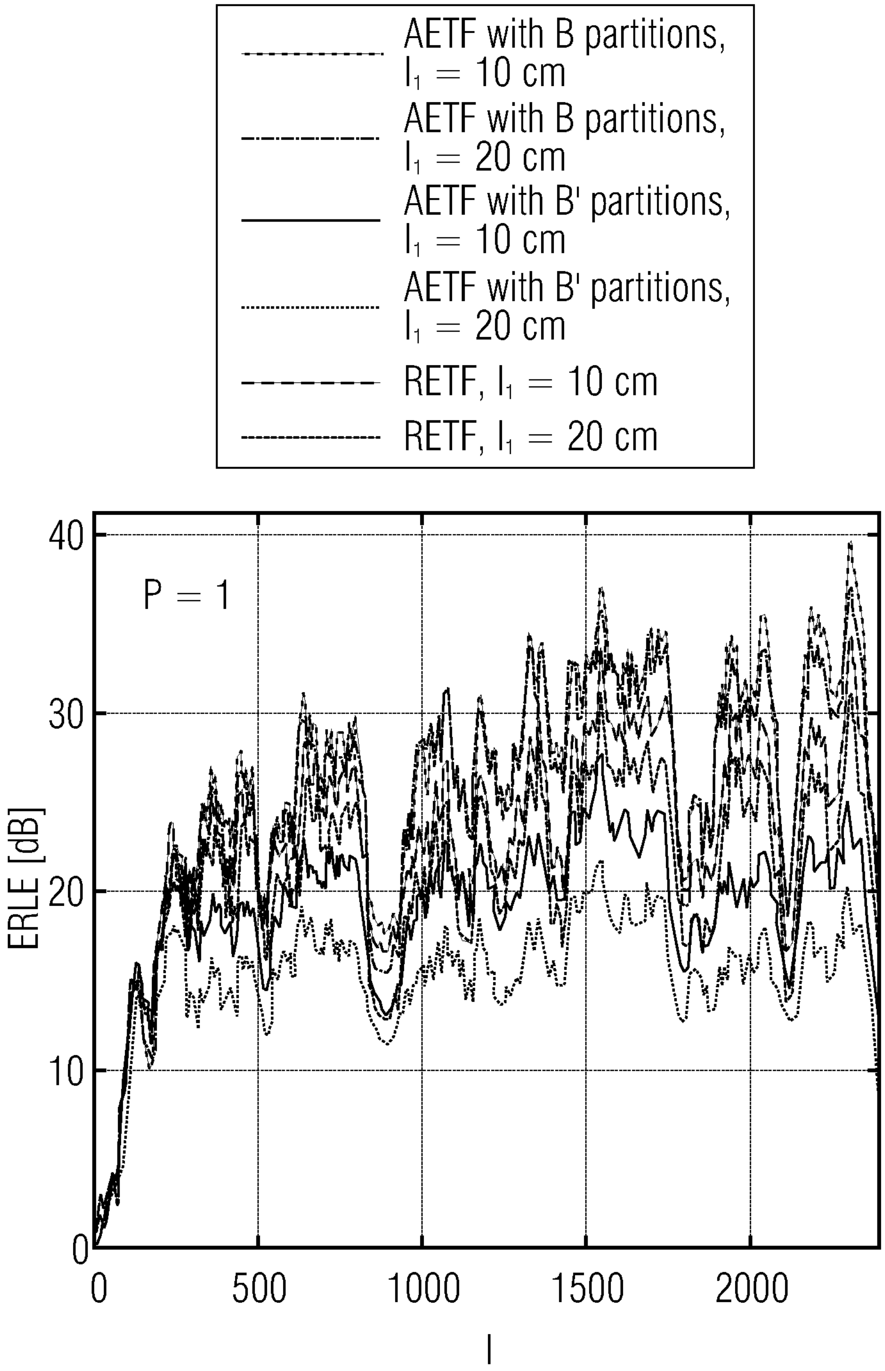

A performance comparison for $T_{60}$=0.15 s, is shown in FIGS. 7A to 7C. In particular, FIGS. 7A to 7C depict a comparison between AETF and RETF-based AEC with $T_{60}$=0.15 s and L=256 taps. The results depicted in the top-left and top-right sub-figures correspond to P=1 and 2 for the baseline set-up. It can be observed that for P=1, the RETF-based approach outperforms the AETF-based one with the same number of causal partitions. For P=2, the performance of the AETF-based approach is visibly enhanced, and the advantage obtained by using the RETF-based approach is diminished.

Nevertheless, the RETF-based approach still performs better, and nearly as well as the AETF-based one with B=9 partitions. In the bottom, a comparison for different simulation set-ups is provided for P=1. On the left, the results with different inter-microphone distances are shown. While, on the right, different distances between loudspeaker and primary microphone are evaluated. It can be observed that, for all conditions under test, enlarging any of these parameters impacts negatively on the canceler's performance. It should be noted that increasing the inter-microphone distance has a higher impact on the proposed approach, and that, in general, $l_1$ has a higher impact on the canceler's performance. Still, for the parameters used in these simulations, the proposed approach is able to outperform AETF-based AEC with equal number of causal partitions.

Figure 8:
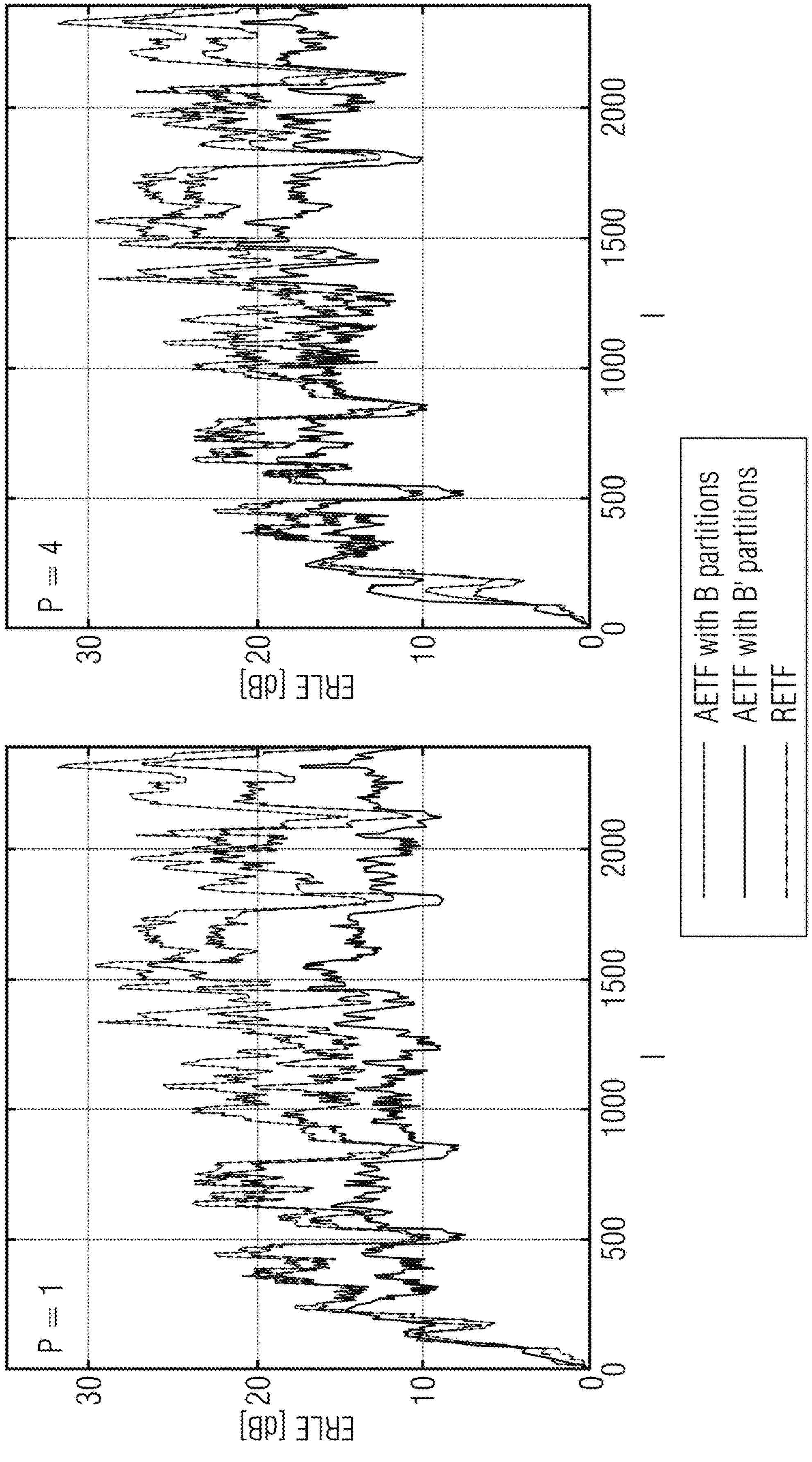
FIG. 8 illustrates a comparison between AETF and RETF-based AEC with $T_{60}$=0.35 s and L=1024 taps.

Finally, the results shown in FIG. 8 correspond to the simulated set-up with $T_{60}$=0.35 s. In particular, FIG. 8 illustrates a comparison between AETF and RETF-based AEC with $T_{60}$=0.35 s and L=1024 taps. The results obtained with P=1 and 4 partitions are depicted in the left and right sub-figures.

It can be observed that the proposed method outperforms, in both test-cases, the AETF-based approach with the same number of causal partitions. Further, for P=4 it performs only moderately worse than the AETF-based AEC with B=15.

To sum up, it was shown that the proposed approach is able to outperform state-of-the-art AETF-based AEC with equal number of causal partitions. Further, it was demonstrated that by using RETF-based AEC, the number of estimated partitions can be reduced, at the cost of a moderate loss in performance.

In the following, the usage of frequency-domain adaptive filters according to embodiments is described.

In particular, a description is provided using partitioned-block frequency-domain adaptive filters (PB-FDAFs) (see, e.g., [24]). In particular, the efficient implementation of frequency-domain adaptive filters (FDAFs) (see, e.g., [24], [26]), which is the frequency counterpart of block-time-domain adaptive filters (see, e.g., [27], [28]), highly differs from the STFT one. For more information on this (see, e.g., [20]) and references therein.

According to some embodiments, the two or more received audio channels and the two or more modified audio channels may, e.g., be channels of a partitioned-block frequency domain, wherein each of the two or more received audio channels and the two or more modified audio channels comprises a plurality of partitions. The reference signal and the first and the second interference signals may, e.g., be signals of the partitioned-block frequency domain, wherein each of the reference signal and the first and the second interference signals comprises a plurality of partitions.

In some embodiments, the second filter unit 122; 322; 522 may, e.g., be configured to determine a filter configuration depending on the first estimation of the first interference signal and depending on the second received audio channel. Moreover, the second filter unit 122; 322; 522 may, e.g., be configured to determine the second estimation of the second interference signal depending on the first estimation of the first interference signal and depending on the filter configuration. Furthermore, the second filter unit 122; 322; 522 may, e.g., be configured to determine the filter configuration for a second time index depending on the filter configuration for a first time index that precedes the second time index in time, depending on the first estimation of the first interference signal for the first time index, and depending on a sample of the second modified audio channel for the first time index.

Subsequently, a description of embodiments using PB-FDAFs is outlined using the overlap-save technique (see, e.g., [25], [29]). The partitioned-block frequency domain formulation of the microphone signal is $$y_n(\ell) = d_n(\ell) + r_n(\ell),\ n \in \{1, \ldots, N\}, \tag{13}$$

where the echo signal in the frequency domain is obtained after linearizing the outcome of a circular convolution of length K:

$$d_n(\ell) = F\operatorname{diag}\{[0, \underbrace{\ldots}_{Q}, 0, 1, \underbrace{\ldots}_{V}, 1]\}F^{-1}\sum_{b=0}^{B-1} X(\ell, b)h_n(b). \tag{14}$$

where F is the discrete Fourier transform (DFT) matrix of size K×K, and the frequency-domain representation of the b-th AIR partition is given by:

$$h_n(b) = F[h_n(bQ), \ldots, h_n((b+1)Q-1), 0_{1\times V}]^T,$$

where Q is the partition length, and V is the length of the zero-padding. Further, the input loudspeaker signal is formulated as a K×K diagonal matrix of the form (see, e.g., [25]), $$X(\ell, b) = \operatorname{diag}\{F[x(\ell R - bQ - K + 1), \ldots, x(\ell R)]^T\}.$$

It should be mentioned that the total number of linear components resulting from the circular convolution in (14) is K–Q+1, yet, in order to simplify the subsequent derivations, according to embodiments, V=K–Q linear components are selected in (14). Now, it should possible to deduce that V is the output signal frame length, and that Q=K–V, is the length of the wrap-around error, such that the general frequency-domain formulation of the output signals a∈{y, d,r,e}; e.g. is equal to:

$$\alpha_n(\ell) = F[0, \underbrace{\ldots}_{Q}, 0, \alpha_n(\ell R - V + 1), \ldots, \alpha_n(\ell R)]^T,$$

where the time-domain signal samples are denoted by $a_n(t)$, with t denoting the discrete time index. For notational brevity, according to embodiments, it is defined:

$$\underline{X}(\ell) = [X(\ell, 0), \ldots, X(\ell, B-1)],$$

$$\underline{h}_n = [h_n^T(0), \ldots, h_n^T(B-1)]^T.$$

which are, respectively, a stacked matrix of frequency-domain input matrices, and a stacked vector of frequency-domain AIR partitions. Hereafter, it is possible to concisely formulate (14) as $d_n(l)=G\underline{X}(l)\underline{h}_n$, where G is the circular convolution constraining matrix in the frequency domain.

Applying the latter is equivalent to applying an inverse DFT, rejecting the circular components in the time domain by multiplying the result of a circular convolution with the circular convolution constraining window $g=\lfloor 0_{1\times Q}, 1_{1\times V}\rfloor$, and transforming the result of the linearization back to the frequency domain. It is important to emphasize the fact that the formulation in the frequency-domain is causal, as there is no need to account for a look-ahead in order to estimate the AETFs. In the frequency domain, the error signal after cancellation is $$e_n(\ell) = y_n(\ell) - \hat{d}_n(\ell),\ n \in \{1, \ldots, N\}, \tag{15}$$

and a generic PB-FDAF update equation is $$\underline{\hat{h}}_n(\ell+1) = \underline{\hat{h}}_n(\ell) + \underline{M}_n\underline{\overline{G}X}^H(\ell)e_n(\ell), \text{ where} \tag{16}$$

-continued $$\underline{\overline{G}} = \begin{bmatrix} \overline{G} & 0_{K\times K} & \dots & 0_{K\times K} \\ 0_{K\times K} & \overline{G} & \dots & 0_{K\times K} \\ \vdots & \vdots & \ddots & \vdots \\ 0_{K\times K} & \dots & 0_{K\times K} & \overline{G} \end{bmatrix}, \text{ and}$$

$$\overline{G} = F\text{diag}\{[1_{1\times Q}, 0_{1\times V}]\}F^{-1} = F\text{diag}\{\overline{g}\}F^{-1}$$

denotes the circular correlation constraining matrix, where $\overline{g}$ is the time-domain circular correlation constraining window, and the operator diag{v} generates a diagonal matrix with the elements of v on its main diagonal.

In a similar manner, for the formulation using RETFs one can define the secondary echo signals as $$d_n(\ell) = G\sum_{p=-P_{nc}}^{P-P_{nc}-1} D_1(\ell, p)a_n(p) = G\underline{D}_1(\ell)\underline{a}_n,\ n \in \{2, \dots, N\}, \quad (17)$$

where without loss of generality $D_1(l,p)=\text{diag}\{F[d_1(lR-pQ-K+1), \dots, d_1(lR)]^T\}$ is the primary, or reference, echo signal, and $\underline{D}_1(l)$ and $\underline{a}_n$ are defined analogously to $\underline{X}(l)$ and $\underline{h}_n$.

It should be remembered that, in contrast to the STFT-domain formulation, frequency domain AETFs and RETFs are causal, e.g. $h_n(0)$ and $a_n(0)$ do not model any non-causal coefficients. However, depending on the relative position of the primary microphone with respect to the secondary ones, RETFs can be causal or non-causal. Consequently, a look-ahead of $P_{nc}$ partitions of the primary echo signal is needed to account for the possible non-causality of the frequency-domain RETFs $a_n(p)$.

In practice, this can be overcome by delaying the secondary microphone signals, as depicted in FIG. 3 in time or frequency domain. For synchronization, the primary error signal after cancellation has to be delayed too. For notational brevity, according to embodiments, it is assumed for now that $P_{nc}=0$.

As in (8), according to embodiments, $\underline{D}_1(l)$ is approximated by $\hat{\underline{D}}_1(l)$ to compute the estimates of the secondary echo signals:

$$\hat{d}_n(\ell) = G\hat{\underline{D}}_1(\ell)\hat{\underline{a}}_n(\ell),\ n \in \{2, \dots, N\}. \quad (18)$$

The error signal after cancellation is then equal to $$e_n(\ell) = y_n(\ell) - G\hat{\underline{D}}_1(\ell)\hat{\underline{a}}_n(\ell),\ n \in \{2, \dots, N\}, \quad (19)$$

and minimizing the cost-function $$E\{e_n^H(\ell)e_n(\ell)\}$$

leads to the following expression for the optimal RETFs in the frequency domain:

$$\hat{\underline{a}}_n^{opt}(\ell) = E\{\hat{\underline{D}}_1^H(\ell)G\hat{\underline{D}}_1(\ell)\}^{-1}E\{\hat{\underline{D}}_1^H(\ell)y_n(\ell)\} = \underline{\Psi}_1(\ell)^{-1}\underline{\psi}_{1n}(\ell, k). \quad (20)$$

Consequently, Newton's method takes the following form $$\hat{\underline{a}}_n(\ell+1) = \hat{\underline{a}}_n(\ell) + \underline{\Psi}_1(\ell)^{-1}\underline{\overline{G}}\hat{\underline{D}}_1^H(\ell)e_n(\ell), \quad (21)$$

if one formulates the adaptive algorithm in the partitioned-block frequency domain, with)

$$\underline{\Psi}_1(\ell+1) = \beta\underline{\Psi}_1(\ell) + (1-\beta)\underline{\overline{G}}\hat{\underline{D}}_1^H(\ell)G\hat{\underline{D}}_1(\ell). \quad (22)$$

In a more general embodiment, the second filter unit 122; 322; 522 is configured to determine the filter configuration in the partitioned-block frequency domain according to $$\hat{\underline{a}}_n(\ell+1) = \hat{\underline{a}}_n(\ell) + C_n\underline{\overline{G}}\hat{\underline{D}}_1^H(\ell)e_n(\ell)$$

wherein l+1 indicates the second time index, and wherein l indicates the first time index, and wherein k indicates a frequency index, wherein $\hat{\underline{a}}_n(l+1)$ is the filter configuration for the second time index, and wherein $\hat{\underline{a}}_n(l)$ is the filter configuration for the first time index, wherein $\hat{\underline{D}}_1(l)$ is the first estimation of the first interference signal for the first time index, wherein $C_n$ is a step-size matrix, wherein $e_n(l)$ is the second modified audio channel for the first time index, and wherein $\underline{\overline{G}}$ is a circular convolution constraining matrix.

In the following, implementation and synchronization aspects of embodiments are considered.

In particular, a detailed description of non-causal ($P_{nc}>0$) implementations according to embodiments is provided.

Due to the possible non-causality of the RETF filters, the secondary microphone signals may be delayed, as depicted in FIG. 3, to ensure that the non-causal coefficients are also modeled by the estimated RETFs in the (PB) frequency domain. There are two strategies to do so:

- Buffering the input signals to the secondary microphones on a sample basis, e.g., in time domain. This allows the user to keep the lowest possible delay. However, for synchronization, the primary signal after cancellation has to be delayed accordingly, and this implies having to transform $e_1(l)$ back to the time domain.
- Buffering the input signals to the secondary microphones in the frequency domain. Consequently, these have to be delayed on a frame basis, resulting in a higher delay as the one introduced in time domain. The advantage of this option resides in the fact that it is not necessary to transform the primary signal after cancellation to the time domain. Consequently, the multichannel interference canceler can be interfaced directly in the frequency domain to a post-processor.

In the following, two possible implementations are described in detail.

At first, embodiments with delayed secondary microphone signals are considered.

From (17) it is evident that a delay of $P_{nc}$ partitions added to all secondary microphone signals enables the estimation of potential non-causalities of the RETFs $a_n(p)$. The corresponding implementation is similar to the one depicted in FIG. 3 with D being an integer multiple of the partition size Q. In this way the first $P_{nc}$ partitions of the adaptive filter are used to model $Q\cdot P_{nc}$ non-causal RETF coefficients. With this simple approach at least 2 partitions may be used in order to estimate causal as well as non-causal RETF coefficients, in this simple case the first filter partition models the non-causal coefficients of $a_n(-1)$.

Now, embodiments with symmetric gradient constraint are considered.

An improvement of the method described above considers the modification of the gradient constraint $\overline{G}$ in order to retain a maximum of $$\frac{Q}{2}$$

causal coefficients as as well as $$\frac{Q}{2}$$

non-casual coefficients of the time-domain circular correlation. To this end, according to embodiments, the constraint $\overline{G}$ from (16) is approximated in this way $$\overline{G}^{sym} = F\mathrm{diag}\left\{\left[1_{1\times\frac{Q}{2}}, 0_{1\times V}, 1_{1\times\frac{Q}{2}}\right]\right\}F^{-1} = F\mathrm{diag}\{\overline{g}^{sym}\}F^{-1}. \tag{23}$$

To guarantee an alias-free output after the filtering also the convolution constraint in (14) has to be modified accordingly:

$$G^{sym} = F\mathrm{diag}\{[0, \underbrace{\ldots}_{\frac{Q}{2}}, 0, (1, \underbrace{\ldots}_{V}, 1), 0, \underbrace{\ldots}_{\frac{Q}{2}}, 0]\}F^{-1} = F\mathrm{diag}\{g^{sym}\}F^{-1}. \tag{24}$$

Note that the above constraint discards $$\frac{Q}{2}$$

past samples as well as the most recent $$\frac{Q}{2}$$

output samples of the circular convolution in order to provide the linear convolution output, this causes a delay of $$\frac{Q}{2}$$

samples in the estimates of the secondary echo signals.

These symmetric constraints are nothing but the original time-domain constraints g and $\overline{g}$, circularly shifted by $$\frac{Q}{2}$$

samples. Thus the corresponding frequency-domain representation are then $\overline{G}^{sym}=J\overline{G}$ and $G^{sym}=JG$, respectively, where the constant matrix $$J = \mathrm{diag}\left\{\left[e^{j\cdot\frac{2\pi}{K}\frac{Q}{2}0}, e^{j\cdot\frac{2\pi}{K}\frac{Q}{2}1}, \ldots, e^{j\cdot\frac{2\pi}{K}\frac{Q}{2}(K-1)}\right]\right\}, \tag{25}$$

is the frequency-domain equivalent of the circular shift. For a practical implementation the above matrix is not of interest as the constraints are typically applied in the time-domain.

Nevertheless a similar matrix $\underline{J}$ can be defined to manipulate the signals in the frequency-domain, before and after the usual constraints, obtaining the same selection of linear coefficients provided by (23) and (24). For instance the desired weight update, using Newton's method, can be obtained as $$\underline{\hat{a}}_n^{sym}(\ell+1) = \underline{\hat{a}}_n^{sym}(\ell) + \underline{\Psi}_1(\ell)^{-1}\underline{J}^H\left(\underline{\overline{G}J}\left(\underline{D}_1^H(\ell)e_n(\ell)\right)\right). \tag{26}$$

By using the above formula according to embodiments, flexibility is gained as the selection of linear coefficients is determined by the definition of $\underline{J}$. In fact, $\underline{J}$ can be tailored to very specific cases, for example it may implement a shift shorter than $$\frac{Q}{2}$$

reducing the number of non-causal coefficients and consequently the system delay.

Now, a summary of implementation approaches using PB-FDAF is provided.

The choice of which implementation to use depends on the application scenario. It is evident that without assumptions on the relative source-microphone positions, the introduction of a certain delay may be used to achieve high quality filter output. The following table summarizes the presented implementation methods.

| Approach | Add. delay | Min. part. num. | Impl. notes |
|---|---|---|---|
| Delayed sec. mic signals | ≥Q | 2 | original PB-FDAF |
| Sym. filter constraint | $\le\frac{Q}{2}$ | 1 | reduced delay |

In the following, a complexity analysis is described for the specific case in which there is 1 primary channel and N−1 secondary channels.

At first, the time domain is considered.

Subsequently, an exemplary complexity analysis is provided in terms of additions and multiplications. To this end, denoting the length of the estimated primary filter as L, and the length of the N−1 estimated secondary filters as P, and assume that the primary and secondary filters are estimated using adaptive filtering techniques. The complexity per input signal sample of an adaptive filter in the time domain is $$\mathcal{O}(AF) \approx 2M + M\mathcal{O}(\mathrm{Update}, M),$$

where M∈{L,N}, and the complexity of the update equation O(Update,M) depends on the adaptive algorithm used and, in many cases, also on the filter length. Hence, if N adaptive filters are used in parallel (one per microphone), the algorithmic complexity of multi-microphone AEC is NO(AF).

The proposed method is able to reduce the algorithmic complexity by reducing the length of the adaptive filters. The reduction in algorithmic complexity is then given by the ratio $$\frac{O(\text{Proposed})}{NO(AF)} = \frac{[2L + LO(\text{Update}, L)] + (N-1)[2P + PO(\text{Update}, P)]}{N(2L + LO(\text{Update}, L)]} \tag{27}$$

In general, if the same adaptive algorithm is used for the estimation of both the primary and secondary filters, then the ratio is given by $$\frac{O(\text{Proposed})}{NO(AF)} \approx \frac{1}{N} + \frac{N-1}{N}\frac{P}{L}\left[\frac{2 + O(\text{Update}, P)}{2 + O(\text{Update}, L)}\right] \tag{28}$$

The simplest example would be: if the least-mean squares (LMS) algorithm (see, e.g., [2]) is used for the primary and secondary echo cancelers, O(Update)=1 is independent on the filter length, and the ratio is given by $$\frac{O(\text{Proposed})}{NBO(AF)} \approx \frac{1}{N} + \frac{N-1}{N}\frac{P}{L} \tag{29}$$

If different adaptive filters are used for the estimation of the primary and secondary filters, the computational complexity of the individual algorithms has to be carefully considered.

Now, the STFT domain is considered.

In the following, the complexity in terms of additions and multiplications is analyzed. To this end, first looking into the complexity per partition of an adaptive filter in the STFT domain, which is $$O(AF) = \frac{3}{Q}O(FFT) + \underbrace{O(CplxMult) + 2K}_{\text{filtering \& cancellation}} + O(\text{Update}),$$

where $Q \in \{P,B\}$, $O(FFT) \approx 2K \log_2(K) - 4K$ is the complexity of a fast Fourier transform (FFT), O(CplxMult)=6K is the complexity of a complex multiplication of length K (see, e.g., [30]) and the complexity of the update equation O(Update) depends on the adaptive algorithm used. Hence, if N adaptive filters are used in parallel (one per microphone), the algorithmic complexity of multi-microphone AEC per partition is NO(AF).

The proposed method is able to reduce the algorithmic complexity if P<B. The reduction in algorithmic complexity is then given by the ratio $$\frac{O(\text{Proposed})}{NBO(AF)} = \frac{BO(AF) + (N-1)PO(AF)}{NBO(AF)}.$$

Consequently, if the same adaptive filter is used for the primary and secondary echo cancelers, the ratio is given by $$\frac{O(\text{Proposed})}{NBO(AF)} \approx \frac{1}{N} + \frac{N-1}{N}\frac{P}{B}.$$

If different adaptive filters are used for the AETF and RETF estimation, the computational complexity of the individual algorithms has to be carefully considered.

Specific applications of embodiments may, e.g., implement a low complexity solution to MC-AEC for the following applications:

Smart phones, tablets and personal computers.

Voice-activated assistants, smart speakers and smart-home devices.

Smart televisions.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] E. Hansler and G. Schmidt, "Acoustic Echo and Noise Control: A practical Approach" New Jersey, USA: Wiley, 2004.

[2] S. Haykin, "Adaptive Filter Theory", 4th ed. New Jersey, USA: Prentice-Hall, 2001.

[3] W. Kellermann, "Strategies for combining acoustic echo cancellation and adaptive beamforming microphone arrays", in Proc. IEEE ICASSP, Munich, Germany, April. 1997, pp. 219-222.

[4] O. Shalvi and E. Weinstein, "System identification using nonstationary signals", IEEE Trans. Signal Process., vol. 44, no. 8, pp. 2055-2063, 1996.

[5] S. Gannot, D. Burshtein, and E. Weinstein, "Signal enhancement using beamforming and nonstationarity with applications to speech," IEEE Trans. Signal Process., vol. 49, no. 8, pp. 1614-1626, August 2001.

[6] I. Cohen, "Relative transfer function identification using speech signals," IEEE Trans. Speech Audio Process., vol. 12, no. 5, pp. 451-459, September 2004.

[7] R. Talmon, I. Cohen, and S. Gannot, "Relative transfer function identification using convolutive transfer function approximation," IEEE Trans. Audio, Speech, Lang. Process., vol. 17, no. 4, pp. 546-555, May 2009.

[8] G. Reuven, S. Gannot, and I. Cohen, "Joint noise reduction and acoustic echo cancellation using the transfer-function generalized sidelobe canceller," Speech Communication, vol. 49, no. 7-8, pp. 623-635, August 2007.

[9] R. Talmon, I. Cohen, and S. Gannot, "Convolutive transfer function generalized sidelobe canceler," IEEE Trans. Audio, Speech, Lang. Process., vol. 17, no. 7, pp. 1420-1434, September 2009.

[10] T. Dvorkind and S. Gannot, "Speaker localization in a reverberant environment," in Proc. the 22nd convention of Electrical and Electronics Engineers in Israel (IEEEI), Tel-Aviv, Israel, December 2002, pp. 7-7.

[11] T. G. Dvorkind and S. Gannot, "Time difference of arrival estimation of speech source in a noisy and reverberant environment," Signal Processing, vol. 85, no. 1, pp. 177-204, January 2005.

[12] X. Li, L. Girin, R. Horaud, and S. Gannot, "Estimation of the direct-path relative transfer function for supervised sound-source localization," IEEE Trans. Audio, Speech, Lang. Process., vol. 4, no. 11, pp. 2171-2186, November 2016.

[13] C. Yemdji, M. Mossi Idrissa, N. Evans, C. Beaugeant, and P. Vary, "Dual channel echo postfiltering for hands-free mobile terminals," in Proc. IWAENC, Aachen, Germany, September 2012, pp. 1-4.

[14] C. Yemdji, L. Lepauloux, N. Evans, and C. Beaugeant, "Method for processing an audio signal and audio receiving circuit," U.S. Patent 2014/0 334 620, 2014.

[15] W. Kellermann, "Joint design of acoustic echo cancellation and adaptive beamforming for microphone arrays," in Proc. Intl. Workshop Acoust. Echo Noise Control (IWAENC), London, U K, 1997, pp. 81-84.

[16] W. Herbordt and W. Kellermann, "GSAEC—acoustic echo cancellation embedded into the generalized sidelobe canceller," in Proc. European Signal Processing Conf. (EUSIPCO), vol. 3, Tampere, Finland, September 2000, pp. 1843-1846.

[17] W. Herbordt, W. Kellermann, and S. Nakamura, "Joint optimization of LCMV beamforming and acoustic echo cancellation," in Proc. European Signal Processing Conf. (EUSIPCO), Vienna, Austria, September 2004, pp. 2003-2006.

[18] K.-D. Kammeyer, M. Kallinger, and A. Mertins, "New aspects of combining echo cancellers with beamformers," in Proc. IEEE ICASSP, vol. 3, Philadelphia, USA, March 2005, pp. 137-140.

[19] Y. Avargel and I. Cohen, "Adaptive system identification in the short-time fourier transform domain using cross-multiplicative transfer function approximation," IEEE Trans. Audio, Speech, Lang. Process., vol. 6, no. 1, pp. 162-173, January 2008.

[20] "System identification in the short-time Fourier transform domain with crossband filtering," IEEE Trans. Audio, Speech, Lang. Process., vol. 15, no. 4, pp. 1305-1319, May 2007.

[21] "On multiplicative transfer function approximation in the short-time fourier transform domain," IEEE Signal Process. Lett., vol. 14, no. 5, pp. 337-340, May 2007.

[22] I. Cohen, "Speech enhancement using a noncausal a priori SNR estimator," IEEE Signal Process. Lett., vol. 11, no. 9, pp. 725-728, September 2004.

[23] J. B. Allen and D. A. Berkley, "Image method for efficiently simulating small-room acoustics," J. Acoust. Soc. Am., vol. 65, no. 4, pp. 943-950, April 1979.

[24] P. C. W. Sommen, "Partitioned frequency-domain adaptive filters," in Proc. Asilomar Conf. on Signals, Systems and Computers, 1989, pp. 677-681.

[25] J. J. Shynk, "Frequency-domain and multirate adaptive filtering," IEEE Signal Process. Mag., vol. 9, no. 1, pp. 14-37, January 1992.

[26] S. Haykin, "Adaptive Filter Theory", 4th ed. Prentice-Hall, 2002.

[27] M. Dentino, J. McCool, and B. Widrow, "Adaptive filtering in the frequency domain," Proc. of the IEEE, vol. 66, no. 12, pp. 1658-1659, December 1978.

[28] G. A. Clark, S. R. Parker, and S. K. Mitra, "A unified approach to time- and frequency-domain realization of FIR adaptive digital filters", IEEE Trans. Acoust., Speech, Signal Process., vol. 31, no. 5, pp. 1073-1083, October 1983.

[29] A. Oppenheim and R. W. Schafer, "Digital Signal Processing", 2nd ed. Prentice-Hall Inc., Englewood Cliff, N J, 1993.

[30] R. M. M. Derkx, G. P. M. Engelmeers, and P. C. W. Sommen, "New constraining method for partitioned block frequency-domain adaptive filters", IEEE Trans. Signal Process., vol. 50, no. 3, pp. 2177-2186, 2002.

The invention claimed is:

1. An apparatus for multichannel interference cancellation in a received audio signal comprising two or more received audio channels to acquire a modified audio signal comprising two or more modified audio channels, the apparatus comprising:

a first filter unit being configured to generate a first estimation of a first interference signal depending on a reference signal;

a first interference canceller being configured to receive the first estimation of the first interference signal and being configured to generate a first modified audio channel of the two or more modified audio channels from a first received audio channel of the two or more received audio channels depending on the first estimation of the first interference signal by subtracting a first estimation signal from the first received audio channel, wherein the first estimation signal is the first estimation of the first interference signal;

a second filter unit being configured to receive the first estimation of the first interference signal, being same as the first estimation received by the first interference canceller, and being configured to generate a second estimation of a second interference signal using the first estimation of the first interference signal; and a second interference canceller being configured to generate a second modified audio channel of the two or more modified audio channels from a second received audio channel of the two or more received audio channels depending on the second estimation of the second interference signal, by subtracting a second estimation signal from the second received audio channel, wherein the second estimation signal is the second estimation of the second interference signal, wherein the apparatus is configured to output the first modified audio channel and the second modified audio channel, and wherein the second filter unit is configured to determine a filter configuration, such that the filter configuration depends on a cross-correlation between the first estimation of the first interference signal and the second received audio channel.

2. The apparatus according to claim 1, wherein the first estimation of the first interference signal is a first estimation of a first acoustic echo signal, wherein the second estimation of the second interference signal is a second estimation of a second acoustic echo signal, wherein the first interference canceller is configured to conduct acoustic echo cancellation on the first received audio channel to acquire the first modified audio channel, and wherein the second interference canceller is configured to conduct acoustic echo cancellation on the second received audio channel to acquire the second modified audio channel.

3. The apparatus according to claim 1, wherein the two or more received audio channels and the two or more modified audio channels are channels of a transform domain, and wherein the reference signal and the first and second interference signals are signals of the transform domain.

4. The apparatus according to claim 1, wherein the two or more received audio channels and the two or more modified audio channels are channels of a short-time Fourier transform domain, and wherein the reference signal and the first and second interference signals are signals of the short-time Fourier transform domain.

5. The apparatus according to claim 1, wherein the second filter unit is configured to determine the filter configuration depending on the first estimation of the first interference signal and depending on the second received audio channel, and wherein the second filter unit is configured to determine the second estimation of the second interference signal depending on the first estimation of the first interference signal and depending on the filter configuration.

6. The apparatus according to claim 5, wherein the second filter unit is configured to determine the filter configuration by minimizing a cost function or by minimizing an error criterion.

7. The apparatus according to claim 5, wherein the second filter unit is configured to determine the filter configuration $$\hat{a}_n^{opt}(\ell, k)$$

according to $$\hat{a}_n^{opt}(\ell, k) = \Psi_1(\ell, k)^{-1}\psi_{1n}(\ell, k),$$

wherein $\psi_1(l,k)$ is a covariance matrix of $\hat{d}_1(l,k)$, wherein $\psi_{1n}(l,k)$ is a cross-correlation vector between $\hat{d}_1(l,k)$ and $Y_n(l,k)$, wherein $\hat{d}_1(l,k)$ indicates the first estimation of the first interference signal, wherein $Y_n(l,k)$ indicates the second received audio channel, wherein l denotes a time index, and wherein k indicates a frequency index.

8. The apparatus according to claim 1, wherein the second filter unit is configured to determine the filter configuration for a second time index depending on the filter configuration for a first time index that precedes the second time index in time, depending on the first estimation of the first interference signal for the first time index, and depending on a sample of the second modified audio channel for the first time index.

9. The apparatus according to claim 8, wherein the second filter unit is configured to determine the filter configuration for the second time index according to $$\hat{a}_n(\ell+1,k)=\hat{a}_n(\ell,k)+C_n(\ell,k)\hat{d}_1(\ell,k)E_n^*(\ell,k)$$

wherein l+1 indicates the second time index, wherein l indicates the first time index, and wherein k indicates a frequency index, wherein $\hat{a}_n$(l+1,k) is the filter configuration for the second time index, and wherein $\hat{a}_n$(l,k) is the filter configuration for the first time index, wherein $\hat{d}_1$(l,k) is the first estimation of the first interference signal for the first time index, wherein $E_n$*(l,k) is the second modified audio channel for the first time index, and wherein $C_n$(l,k) is a step-size matrix.

10. The apparatus according to claim 1, wherein the two or more received audio channels and the two or more modified audio channels are channels of a partitioned-block frequency domain, wherein each of the two or more received audio channels and the two or more modified audio channels comprises a plurality of partitions, wherein the reference signal and the first and the second interference signals are signals of the partitioned-block frequency domain, and wherein each of the reference signal and the first and the second interference signals comprises a plurality of partitions.

11. The apparatus according to claim 10, wherein the second filter unit is configured to determine a filter configuration depending on the first estimation of the first interference signal and depending on the second received audio channel, wherein the second filter unit is configured to determine the second estimation of the second interference signal depending on the first estimation of the first interference signal and depending on the filter configuration, and wherein the second filter unit is configured to determine the filter configuration for a second time index depending on the filter configuration for a first time index that precedes the second time index in time, depending on the first estimation of the first interference signal for the first time index, and depending on a sample of the second modified audio channel for the first time index.

12. The apparatus according to claim 11, wherein the second filter unit is configured to determine the filter configuration in the partitioned-block frequency domain according to $$\underline{\hat{a}}_n(\ell+1)=\underline{\hat{a}}_n(\ell)+\underline{C_n\overline{G}\hat{D}_1^H}(\ell)e_n(\ell)$$

wherein l+1 indicates the second time index, and wherein l indicates the first time index, and wherein k indicates a frequency index, wherein $\underline{\hat{a}}_n$(l+1) is the filter configuration for the second time index, and wherein $\underline{\hat{a}}_n$(l) is the filter configuration for the first time index, wherein $\underline{\hat{D}}_1$(l) is the first estimation of the first interference signal for the first time index, wherein $C_n$ is a step-size matrix, wherein $e_n$(l) is the second modified audio channel for the first time index, and wherein $\overline{G}$ is a circular convolution constraining matrix.

13. The apparatus according to claim 1, wherein the received audio signal comprises three or more received audio channels, and wherein the modified audio signal comprises three or more modified audio channels, wherein the apparatus further comprises a third filter unit and a third interference canceller, wherein the third filter unit is configured to generate a third estimation of a third interference signal depending on at least one of the first estimation of the first interference signal and the second estimation of the second interference signal, and wherein the third interference canceller is configured to generate a third modified audio channel $e_3$(t) of the three or more modified audio channels from a third received audio channel $y_3$(t) of the three or more received audio channels depending on the third estimation $\hat{d}_3$(t) of the third interference signal.

14. A method for multichannel interference cancellation in a received audio signal comprising two or more received audio channels to acquire a modified audio signal comprising two or more modified audio channels, the method comprising:

generating, by a first filter unit, a first estimation of a first interference signal depending on a reference signal;

receiving the first estimation of the first interference signal at a first interference canceller, and generating, by the first interference canceller, a first modified audio channel of the two or more modified audio channels from a first received audio channel of the two or more received audio channels depending on the first estimation of the first interference signal by subtracting a first estimation signal from the first received audio channel, wherein the first estimation signal is the first estimation of the first interference signal;

receiving the first estimation of the first interference signal at a second filter unit, being same as the first estimation received by the first interference canceller, and generating, by the second filter unit, a second estimation of a second interference signal using the first estimation of the first interference signal;

generating, by a second interference canceller, a second modified audio channel of the two or more modified audio channels from a second received audio channel of the two or more received audio channels depending on the second estimation of the second interference signal, by subtracting a second estimation signal from the second received audio channel, wherein the second estimation signal is the second estimation of the second interference signal; and outputting the first modified audio channel and the second modified audio channel, wherein a filter configuration is determined at the second filter unit, such that the filter configuration depends on a cross-correlation between the first estimation of the first interference signal and the second received audio channel.

15. A non-transitory digital storage medium having a computer program stored thereon to perform, when the computer program is run by a computer, a method for multichannel interference cancellation in a received audio signal comprising two or more received audio channels to acquire a modified audio signal comprising two or more modified audio channels, wherein the method comprises:

generating, by a first filter unit, a first estimation of a first interference signal depending on a reference signal;

receiving the first estimation of the first interference signal at a first interference canceller, and generating, by the first interference canceller, a first modified audio channel of the two or more modified audio channels from a first received audio channel of the two or more received audio channels depending on the first estimation of the first interference signal by subtracting a first estimation signal from the first received audio channel, wherein the first estimation signal is the first estimation of the first interference signal;

receiving the first estimation of the first interference signal at a second filter unit, being same as the first estimation received by the first interference canceller, and generating, by the second filter unit, a second estimation of a second interference signal using the first estimation of the first interference signal;

generating, by a second interference canceller, a second modified audio channel of the two or more modified audio channels from a second received audio channel of the two or more received audio channels depending on the second estimation of the second interference signal, by subtracting a second estimation signal from the second received audio channel, wherein the second estimation signal is the second estimation of the second interference signal; and outputting the first modified audio channel and the second modified audio channel, wherein a filter configuration is determined at the second filter unit, such that the filter configuration depends on a cross-correlation between the first estimation of the first interference signal and the second received audio channel.

* * * * *